US012618758B2

(12) United States Patent (10) Patent No.: US 12,618,758 B2
Ogihara (45) Date of Patent: May 5, 2026

(54) WRINKLE GENERATION DETERMINATION INDEX ACQUISITION METHOD, WRINKLE GENERATION DETERMINATION METHOD, WRINKLE GENERATION DETERMINATION DEVICE, AND WRINKLE GENERATION DETERMINATION PROGRAM FOR PRESS FORMED PART

(71) Applicant: JFE STEEL CORPORATION, Tokyo (JP)

(72) Inventor: Yuki Ogihara, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 320 days.

(21) Appl. No.: 18/293,240

(22) PCT Filed: Apr. 12, 2022

(86) PCT No.: PCT/JP2022/017606
§ 371 (c)(1),
(2) Date: Jan. 29, 2024

(87) PCT Pub. No.: WO2023/007875
PCT Pub. Date: Feb. 2, 2023

(65) Prior Publication Data
US 2025/0073769 A1 Mar. 6, 2025

(30) Foreign Application Priority Data
Jul. 30, 2021 (JP) ................................. 2021-124997

(51) Int. Cl.
*G01N 3/08* (2006.01)
(52) U.S. Cl.
CPC ...................................... *G01N 3/08* (2013.01)
(58) Field of Classification Search
CPC ........................................................ G01N 3/08
See application file for complete search history.

(56) References Cited

U.S. PATENT DOCUMENTS

2004/0031337 A1* 2/2004 Masaniello ........ G01N 29/4445
73/865.8
2009/0122957 A1* 5/2009 Tanimoto ............. G01N 23/223
378/82
(Continued)

FOREIGN PATENT DOCUMENTS

JP      H11-319971 A      11/1999
JP      2007-229761 A      9/2007
(Continued)

OTHER PUBLICATIONS

"ISO 12004-2: Metallic materials—Sheet and strip—Determination of forming-limit curves—Part 2: Determining of forming-limit curves in the laboratory," International Standard, First edition, Oct. 15, 2008.

(Continued)

*Primary Examiner* — Eric S. McCall
(74) *Attorney, Agent, or Firm* — Oliff PLC

(57) ABSTRACT

A wrinkle generation determination method for a press formed part includes acquiring, for each load ratio in in-plane biaxial directions, a relationship between an in-plane biaxial strain generated in a process of inducing out-of-plane buckling in a measurement part and a load, acquiring an in-plane biaxial strain at a point where a primary differential coefficient of an in-plane uniaxial strain on which a compressive load acts becomes local maximum as a stable behavior limit strain, and acquiring a stable behavior limit line that will be an index for wrinkle generation under a biaxial stress condition by plotting, on two-dimensional coordinates, the stable behavior limit strain acquired for each load ratio in a biaxial stress test in which a load in the in-plane biaxial directions is applied to a cruciform test piece for biaxial test so as to induce out-of-plane buckling in the measurement part.

5 Claims, 10 Drawing Sheets

(56) References Cited

U.S. PATENT DOCUMENTS

| 2015/0226653 | A1 |   | 8/2015 | Rountree et al. |
|---|---|---|---|---|
| 2021/0341363 | A1 |   | 11/2021 | Murakami et al. |
| 2024/0033798 | A1 | * | 2/2024 | Tsukamoto ............. B21B 37/24 |

FOREIGN PATENT DOCUMENTS

| JP | 2007-333638 | A | 12/2007 |
|---|---|---|---|
| JP | 2014-081310 | A | 5/2014 |
| JP | 2014-167470 | A | 9/2014 |
| JP | 2016-003951 | A | 1/2016 |
| JP | 2017-100165 | A | 6/2017 |
| JP | 6246074 | B2 | 12/2017 |
| JP | 2018-080923 | A | 5/2018 |
| JP | 2019-035603 | A | 3/2019 |

| WO | 2020/065815 | A1 | 4/2020 |
|---|---|---|---|
| WO | 2020/170496 | A1 | 8/2020 |

OTHER PUBLICATIONS

Press Molding Difficulty Handbook, 4th Edition, Edited by Japan Sheet Metal Forming Research Group, Nikkan Kogyo Shimbun, Ltd., 2017, pp. 226-227.
May 24, 2022 International Search Report issued in International Patent Application No. PCT/JP2022/017606.
Narayanasamy et al., "Forming, Fracture and Wrinkling Limit Diagram for if Steel Sheets of Different Thickness," Materials & Design, 2008, vol. 29, pp. 1467-1475.
Sep. 24, 2024 Extended Search Report issued in European Patent Application No. 22848958.9.

* cited by examiner (a)                                    (b)

(a)                                                        (b)

(a)                                                        (b)

(a)                                                                                    (b)

(a)                                                                                    (b)

(a)                    (b)

(a)                    (b)

WRINKLE GENERATION DETERMINATION INDEX ACQUISITION METHOD, WRINKLE GENERATION DETERMINATION METHOD, WRINKLE GENERATION DETERMINATION DEVICE, AND WRINKLE GENERATION DETERMINATION PROGRAM FOR PRESS FORMED PART

FIELD

The present invention relates to a wrinkle generation determination index acquisition method for a press formed part so as to obtain an index for determining the presence of wrinkle generation under a biaxial stress condition in a press forming process of the press formed part, and a wrinkle generation determination method, a wrinkle generation determination device, and a wrinkle generation determination program for a press formed part so as to determine the presence of wrinkle generation on the press formed part based on the index.

BACKGROUND

Conventionally, as a material test of a metal sheet, an FLD (forming limit diagram) test is performed to measure a press-formable region without fracturing a thin metal sheet (Non Patent Literature 1, etc.). By using a forming limit diagram obtained by the FLD test, it is possible to objectively and quantitatively evaluate a risk of occurrence of bulging fracture, drawing fracture, and the like during press forming of the thin metal sheet.

In addition, as the material test of the metal sheet, a material test in which a compressive load is applied to a thin metal sheet is also performed (Patent Literature 1, Patent Literature 2, Patent Literature 3, etc.). For example, in the material test disclosed in Patent Literature 3, it is said that the compressive load in an in-plane biaxial direction is applied to a thin test piece of the thin metal sheet, whereby a mechanical property of the thin metal sheet under a biaxial compressive stress condition can be accurately measured. Further, it is expected to contribute to improvement of prediction accuracy of CAE (computer aided engineering) analysis (press forming simulation) in the press forming process by measuring the mechanical property of the thin metal sheet under a compressive stress condition in the thin material tests where the compressive load is applied to the thin metal sheet.

In general, when the thin metal sheet receives the compressive load during press forming, a phenomenon (out-of-plane buckling) in which the thin metal sheet suddenly undergoes out-of-plane deformation and protrudes from a target shape of the press formed part occurs. As a result, wrinkles (hereinafter also referred to as "press wrinkles") may be generated in the press formed part. This press wrinkle generation mechanism is classified into (1) an elastic or plastic buckling behavior of the thin metal sheet and (2) an excess metal or thickening due to excessive or uneven material inflow of the thin metal sheet.

Among them, the elastic or plastic buckling behavior in (1) may be caused by, for example, the compressive stress or the like generated in a flange portion due to shrinkage flanging in the press forming process of a press formed part having a hat-shaped cross section including a punch bottom portion, a side wall portion, and a flange portion, or may be caused by non-uniform deformation of the thin metal sheet due to non-uniform load, non-axisymmetric load, or the like. On the other hand, the excess metal or thickening in (2) is considered to occur at a portion where the shape of the press formed part rapidly changes (see Non Patent Literature 2).

In addition, press wrinkles are more likely to be generated as a thickness of the thin metal sheet is thin and a material strength is low. In bulge forming, since excess metal of a bulge forming surface due to the inflow of the material from a periphery to a forming portion is likely to be a direct cause of press wrinkles, there has been a problem that it is difficult to obtain a press formed part having a target shape while preventing press wrinkle generation.

Therefore, in order to obtain a press formed part in which press wrinkle generation is prevented, it is necessary to clarify causes of wrinkle generation on the press forming process and to determine press forming conditions according to the mechanical property of the thin metal sheet, the target shape of the press formed part, and the like.

As a method of predicting press wrinkle generation, there is a technique of performing press forming simulation by an elasto-plastic finite element method or the like to apply shading according to a degree of compressive stress or compressive strain when a press formed part is displayed on a computer screen during or after forming obtained by the press forming simulation, whereby visually determining the presence of wrinkle generation.

Furthermore, some techniques have been proposed in which a wrinkle generation mechanism is estimated and an index for quantitatively determining the presence of wrinkle generation is obtained based on strain, stress, or the like calculated by the press forming simulation. For example, Patent Literature 4 discloses a technique of evaluating the presence of wrinkle generation by obtaining an equivalent stress and an equivalent strain of each element in the press forming process by the press forming simulation of a sheet-like material based on the elasto-plastic finite element method. When a difference between an equivalent stress obtained from a work hardening curve of the sheet-like material and the equivalent stress obtained by the press forming simulation is large, with respect to the equivalent strain obtained, it is assumed that buckling has occurred at a position of the element, and the difference is obtained as a wrinkle evaluation parameter to evaluate the presence of wrinkle generation. Further, Patent Literature 5 discloses a technique of determining the presence of wrinkle generation on the press formed part in advance by whether a compressive strain generated at a tip of a side wall portion exceeds a wrinkle generation limit strain when the press formed part including a punch bottom portion and the side wall portion curved outward is subjected to shrink flange forming by crash forming. Furthermore, Patent Literature 6 discloses a technique of estimating a curvature radius or curvature after die release based on a bending stress in a cross section in a thickness direction of a formed material at a bottom dead center in press forming, and predicting the presence of wrinkle generation on a material to be formed by press forming according to the estimated curvature radius or curvature.

CITATION LIST

Patent Literature

Patent Literature 1: JP 6246074 B2
Patent Literature 2: JP 2016-3951 A
Patent Literature 3: JP 2019-35603 A
Patent Literature 4: JP H11-319971 A
Patent Literature 5: JP 2017-100165 A
Patent Literature 6: JP 2007-229761 A

Non Patent Literature

Non Patent Literature 1: ISO 12004-2:2008, "Metallic materials—Sheet and strip—Determination of forming-limit curves—Part 2: Determination of forming-limit curves in the laboratory", 2008.

Non Patent Literature 2: Handbook of Difficulty in Press Forming, 4th edition, p. 226, edited by Japan Sheet Metal Forming Research Group, Nikkan Kogyo Shimbun, Ltd., (2017)

SUMMARY

Technical Problem

In all the techniques disclosed in Patent Literatures 4 to 6, a wrinkle generation mechanism is assumed in advance, and a determination index regarding the presence of wrinkle generation is obtained based on the mechanism. However, since a boundary value (critical value) of the determination index for wrinkle generation is sensuously determined by visual observation of wrinkle generation on a press formed part by an experiment or a press forming simulation, lack of objectivity has been a problem. Furthermore, the techniques disclosed in Patent Literatures 4 to 6 are directed to a specific press forming method (e.g., crash forming) or a press formed part having a specific shape. When the press forming method or the shape of the press formed part is different, the state of strain or stress is also different. Thus, there is a problem that the determination index for wrinkle generation required by these techniques is not versatile.

Therefore, similarly to the FLD test on fracture described above, there has been a demand for a material test method capable of easily determining wrinkle generation objectively and quantitatively, and capable of obtaining a versatile index that can determine wrinkle generation regardless of the press forming method or the shape of press formed part. However, the FLD test intends to identify a starting point (limit strain, etc.) at which fracture (cracking) occurs in the thin metal sheet in the press forming process, and it is not possible to obtain an index for wrinkle generation caused by out-of-plane buckling due to a compressive load acting on the thin metal sheet in the press forming process.

Further, most of blank deformations during the press forming using the thin metal sheet as a raw material (blank) occur under a biaxial stress condition in which the compressive load acts at least in an in-plane uniaxial direction of the in-plane biaxial directions. Therefore, in order to determine the presence of wrinkle generation in the press forming, it is necessary to obtain the determination index for wrinkle generation under the biaxial stress condition in which the compressive load acts at least in the in-plane uniaxial direction.

The present invention has been made in view of the above problems, and an object of the present invention is to provide a wrinkle generation determination index acquisition method, a wrinkle generation determination method, a wrinkle generation determination device, and a wrinkle generation determination program for a press formed part capable of obtaining the determination index for wrinkle generation under the biaxial stress condition in the press forming process of the press formed part by the biaxial stress test in which the compressive load at least in the in-plane uniaxial direction is applied to a cruciform test piece for biaxial test, and further determining the presence of wrinkle generation under the biaxial stress condition based on the index obtained.

Solution to Problem

A method for acquiring a wrinkle generation determination index for a press formed part according to a first aspect of the present invention obtains an index for determining presence or absence of wrinkle generation under a biaxial stress condition in a press forming process of the press formed part by a biaxial stress test, the biaxial stress test applying a load in in-plane biaxial directions including at least a compressive load in an in-plane uniaxial direction to a measurement part in an intersecting cross shape of a cruciform test piece for biaxial test, the load being applied to induce out-of-plane buckling in the measurement part, and the method includes: acquiring an in-plane biaxial strain and load relationship by changing a load ratio in the in-plane biaxial directions acting on the measurement part in the biaxial stress test and acquiring, for each the load ratio, a relationship between an in-plane biaxial strain and the load, the in-plane biaxial strain being generated in the measurement part in a process of inducing the out-of-plane buckling in the measurement part; acquiring a stable behavior limit strain by calculating, for each the load ratio, a primary differential coefficient of a strain in the in-plane uniaxial direction on which a larger compressive load acts, obtaining a point at which the primary differential coefficient of the strain calculated becomes local maximum as a stable behavior limit point, and acquiring an in-plane biaxial strain at the stable behavior limit point in the measurement part as the stable behavior limit strain; and acquiring a stable behavior limit line by plotting, on the two-dimensional coordinates, the stable behavior limit strain in the in-plane biaxial directions acquired for each the load ratio and connecting the stable behavior limit strain plotted to obtain the stable behavior limit line to be an index for wrinkle generation under the biaxial stress condition.

A method for acquiring a wrinkle generation determination index for a press formed part according to a second aspect of the present invention obtains an index for determining presence or absence of wrinkle generation under a biaxial stress condition in a press forming process of the press formed part by a biaxial stress test, the biaxial stress test applying a load in in-plane biaxial directions including at least a compressive load in an in-plane uniaxial direction to a measurement part in an intersecting cross shape of a cruciform test piece for biaxial test, the load being applied to induce out-of-plane buckling in the measurement part, and the method includes: acquiring an in-plane biaxial strain and load relationship by changing a load ratio in the in-plane biaxial directions acting on the measurement part in the biaxial stress test and acquiring, for each the load ratio, a relationship between an in-plane biaxial strain and the load, the in-plane biaxial strain being generated in the measurement part in a process of inducing the out-of-plane buckling in the measurement part; acquiring, for each the load ratio, a wrinkle generation starting strain by obtaining a point at which a polarity of an increment of a strain with respect to an increment of the compressive load is reversed in a relationship between an in-plane uniaxial strain on which a larger compressive load acts and the load as a wrinkle generation starting point, and acquiring an in-plane biaxial strain at the wrinkle generation starting point in the measurement part as the wrinkle generation starting strain; and acquiring a wrinkle generation start line by plotting, on two-dimensional coordinates, the wrinkle generation starting strain in the in-plane biaxial directions acquired for each the load ratio and connecting the wrinkle generation starting strain plotted to obtain the wrinkle generation start line under the biaxial stress condition.

A wrinkle generation determination method for a press formed part according to the present invention determines presence or absence of wrinkle generation in a press forming process of the press formed part by using the stable behavior limit line obtained by the method for acquiring a wrinkle generation determination index for the press formed part according to the first aspect of the present invention and the wrinkle generation start line obtained by the method for acquiring the wrinkle generation determination index for the press formed part according to the second aspect of the present invention, and the wrinkle generation determination method includes: calculating an in-plane biaxial strain in the press formed part by performing a press forming simulation on the press formed part so as to obtain the in-plane biaxial strain in the press forming process of the press formed part; acquiring a wrinkle generation determination map indicating the stable behavior limit line and the wrinkle generation start line on two-dimensional coordinates having in-plane biaxial strains as coordinate axes; and determining wrinkle generation on the press formed part by performing plotting of the in-plane biaxial strain in a predetermined portion of the press formed part on the wrinkle generation determination map obtained, determining that there is a high risk of wrinkle generation in the predetermined portion of the press formed part when the plotting is located in a region between the stable behavior limit line and the wrinkle generation start line, and determining that there is wrinkle generation in the predetermined portion of the press formed part when the plotting is located on a compression side from the wrinkle generation start line.

A wrinkle generation determination device for a press formed part according to the present invention determines presence or absence of wrinkle generation in a press forming process of the press formed part by obtaining an index for determining the presence or absence of wrinkle generation under a biaxial stress condition in the press forming process of the press formed part by a biaxial stress test, the biaxial stress test applying a load in in-plane biaxial directions including at least a compressive load in an in-plane uniaxial direction to a measurement part in an intersecting cross shape of a cruciform test piece for biaxial test, the load being applied to induce out-of-plane buckling in the measurement part, and the wrinkle generation determination device includes: an in-plane biaxial strain and load relationship acquisition unit configured to change a load ratio in the in-plane biaxial directions acting on the measurement part in the biaxial stress test and acquire, for each the load ratio, a relationship between an in-plane biaxial strain and the load, the in-plane biaxial strain being generated in the measurement part in a process of inducing the out-of-plane buckling in the measurement part; a stable behavior limit strain acquisition unit configured to calculate, for each the load ratio, a primary differential coefficient of a strain in the in-plane uniaxial direction on which a larger compressive load acts, obtain a point at which the primary differential coefficient of the strain calculated becomes local maximum as a stable behavior limit point, and acquire an in-plane biaxial strain at the stable behavior limit point in the measurement part as a stable behavior limit strain; a stable behavior limit line acquisition unit configured to plot, on two-dimensional coordinates, the stable behavior limit strain in the in-plane biaxial directions acquired for each the load ratio and connect the stable behavior limit strain plotted to obtain a stable behavior limit line to be an index for wrinkle generation under the biaxial stress condition; a wrinkle generation starting strain acquisition unit configured to obtain a point at which a polarity of an increment of a strain with respect to an increment of the compressive load is reversed in a relationship between an in-plane uniaxial strain on which a larger compressive load acts and the load as a wrinkle generation starting point, and acquire an in-plane biaxial strain at the wrinkle generation starting point in the measurement part as a wrinkle generation starting strain; a wrinkle generation start line acquisition unit configured to plot, on two-dimensional coordinates, the wrinkle generation starting strain in the in-plane biaxial directions obtained for each the load ratio and connect the wrinkle generation starting strain plotted to obtain a wrinkle generation start line under the biaxial stress condition; a press formed part in-plane biaxial strain calculation unit configured to perform a press forming simulation on the press formed part so as to obtain the in-plane biaxial strain in the press forming process of the press formed part; a wrinkle generation determination map acquisition unit configured to acquire a wrinkle generation determination map indicating the stable behavior limit line and the wrinkle generation start line on two-dimensional coordinates having in-plane biaxial strains as coordinate axes; and a press formed part wrinkle generation determination unit configured to perform plotting of the in-plane biaxial strain in a predetermined portion of the press formed part on the wrinkle generation determination map obtained, determine that there is a high risk of wrinkle generation in the predetermined portion of the press formed part when the plotting is located in a region between the stable behavior limit line and the wrinkle generation start line, and determine that there is wrinkle generation in the predetermined portion of the press formed part when the plotting is located on a compression side of the wrinkle generation start line.

A wrinkle generation determination program for a press formed part according to the present invention determines presence or absence of wrinkle generation in a press forming process of the press formed part by obtaining an index for determining the presence or absence of wrinkle generation under a biaxial stress condition in the press forming process of the press formed part by a biaxial stress test, the biaxial stress test applying a load in in-plane biaxial directions including at least a compressive load in an in-plane uniaxial direction to a measurement part in an intersecting cross shape of a cruciform test piece for biaxial test, the load being applied to induce out-of-plane buckling in the measurement part, and the wrinkle generation determination program causes a computer to function as: an in-plane biaxial strain and load relationship acquisition unit configured to change a load ratio in the in-plane biaxial directions acting on the measurement part in the biaxial stress test and acquire, for each the load ratio, a relationship between an in-plane biaxial strain and the load, the in-plane biaxial strain being generated in the measurement part in a process of inducing the out-of-plane buckling in the measurement part; a stable behavior limit strain acquisition unit configured to calculate, for each the load ratio, a primary differential coefficient of a strain in the in-plane uniaxial direction on which a larger compressive load acts, obtain a point at which the primary differential coefficient of the strain calculated becomes local maximum as a stable behavior limit point, and acquire an in-plane biaxial strain at the stable behavior limit point in the measurement part as a stable behavior limit strain; a stable behavior limit line acquisition unit configured to plot, on two-dimensional coordinates, the stable behavior limit strain in the in-plane biaxial directions acquired for each the load ratio and connect the stable behavior limit strain plotted to obtain a stable behavior limit line to be an index for wrinkle generation under the biaxial stress condition; a wrinkle generation starting strain acquisition unit configured to obtain a point at which a polarity of an increment of a strain with respect to an increment of the compressive load is reversed in a relationship between an in-plane uniaxial strain on which a larger compressive load acts and the load as a wrinkle generation starting point, and acquire an in-plane biaxial strain at the wrinkle generation starting point in the measurement part as a wrinkle generation starting strain; a wrinkle generation start line acquisition unit configured to plot, on two-dimensional coordinates, the wrinkle generation starting strain in the in-plane biaxial directions obtained for each the load ratio and connect the wrinkle generation starting strain plotted to obtain a wrinkle generation start line under the biaxial stress condition; a press formed part in-plane biaxial strain calculation unit configured to perform a press forming simulation on the press formed part so as to obtain the in-plane biaxial strain in the press forming process of the press formed part; a wrinkle generation determination map acquisition unit configured to acquire a wrinkle generation determination map indicating the stable behavior limit line and the wrinkle generation start line on two-dimensional coordinates having in-plane biaxial strains as coordinate axes; and a press formed part wrinkle generation determination unit configured to perform plotting of the in-plane biaxial strain in a predetermined portion of the press formed part on the wrinkle generation determination map obtained, determine that there is a high risk of wrinkle generation in the predetermined portion of the press formed part when the plotting is located in a region between the stable behavior limit line and the wrinkle generation start line, and determine that there is wrinkle generation in the predetermined portion of the press formed part when the plotting is located on a compression side of the wrinkle generation start line.

Advantageous Effects of Invention

In the present invention, a relationship between a strain in an in-plane biaxial direction and a load is acquired by a biaxial stress test in which a compressive load at least in an in-plane uniaxial direction is applied to a cruciform test piece for biaxial test. A stable behavior limit strain that will be a start point of out-of-plane buckling is obtained from the acquired relationship between the strain and the load. The obtained stable behavior limit strain is plotted on two-dimensional coordinates having in-plane biaxial strains as coordinate axes. Plotted stable behavior limit strains are connected to obtain a stable behavior limit line. As a result, an index for determining generation of faint wrinkles under a biaxial stress condition in the press forming process of the press formed part can be obtained.

In addition, in the present invention, a wrinkle generation starting strain at which the out-of-plane buckling rapidly occurs is obtained from the relationship between the strain in the in-plane uniaxial direction and the load in the biaxial stress test in which the compressive load acts. The obtained wrinkle generation starting strain is plotted on the two-dimensional coordinates having the in-plane biaxial strains as the coordinate axes. Plotted wrinkle generation starting strains are connected to obtain a wrinkle generation start line. As a result, an index for determining generation of obvious wrinkles under the biaxial stress condition in the press forming process of the press formed part can be obtained.

Further, in the present invention, it is possible to objectively and satisfactorily determine wrinkle generation under the biaxial stress condition in the press forming process of the press formed part based on the stable behavior limit line obtained as the index for determining generation of faint wrinkles under the biaxial stress condition and the wrinkle generation start line obtained as the index for determining generation of obvious wrinkles under the biaxial stress condition.

Figure 13:
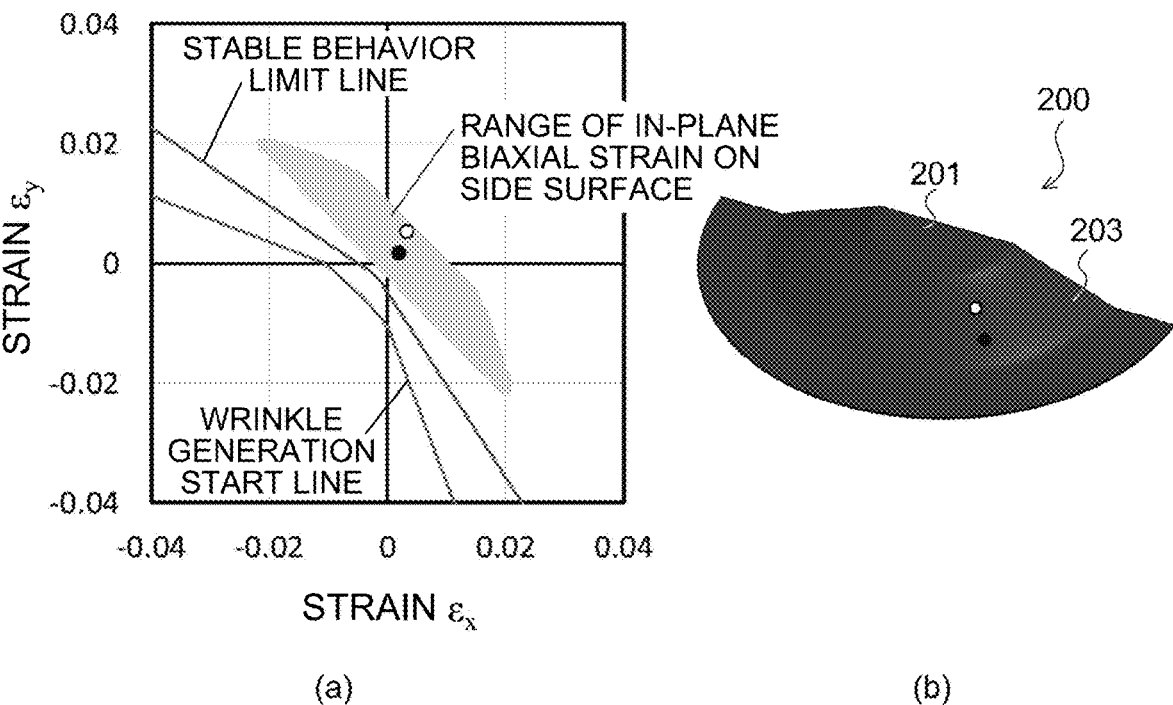

(a) of FIG. 13 is a diagram plotting strains in the in-plane biaxial directions in a side surface portion of a press formed part having a forming height of 25 mm on a wrinkle generation determination map, and (b) of FIG. 13 is a diagram illustrating a shading diagram of the press formed part and positions ($\bigcirc$ and $\bullet$) where wrinkle generation has been determined in an example.

Figure 14:
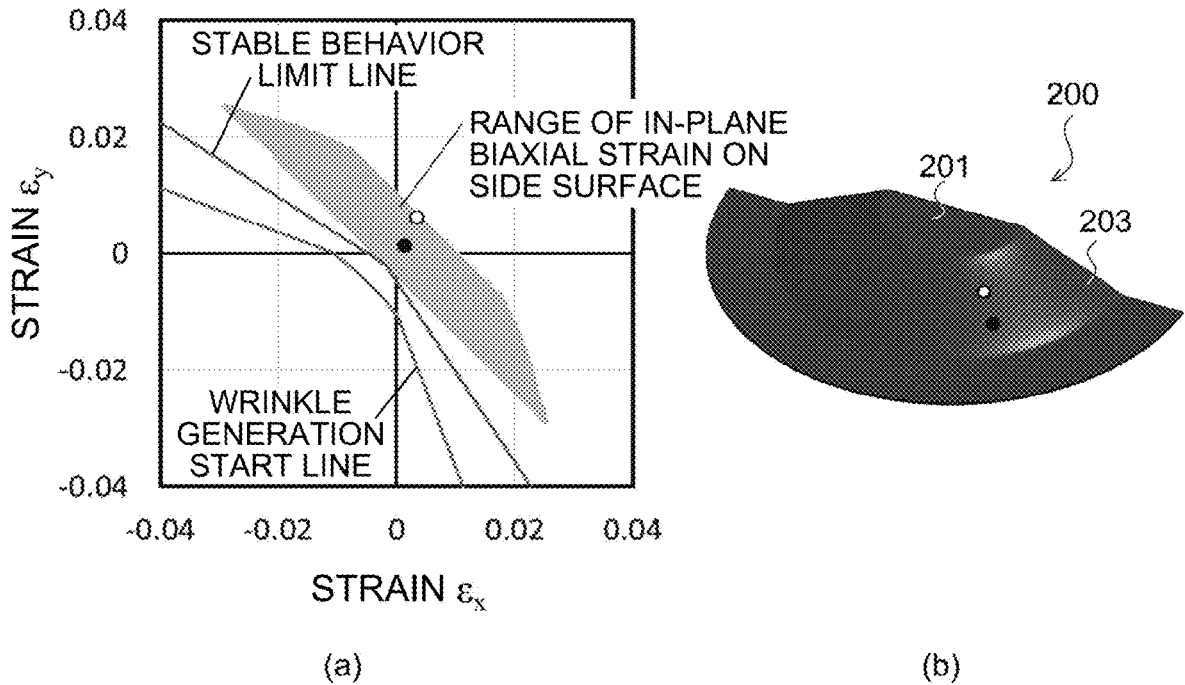

(a) of FIG. 14 is a diagram plotting strains in the in-plane biaxial directions in the side surface portion of a press formed part having a forming height of 30 mm on a wrinkle generation determination map, and (b) of FIG. 14 is a diagram illustrating a shading diagram of the press formed part and positions ($\bigcirc$ and $\bullet$) where wrinkle generation has been determined in an example.

Figure 15:
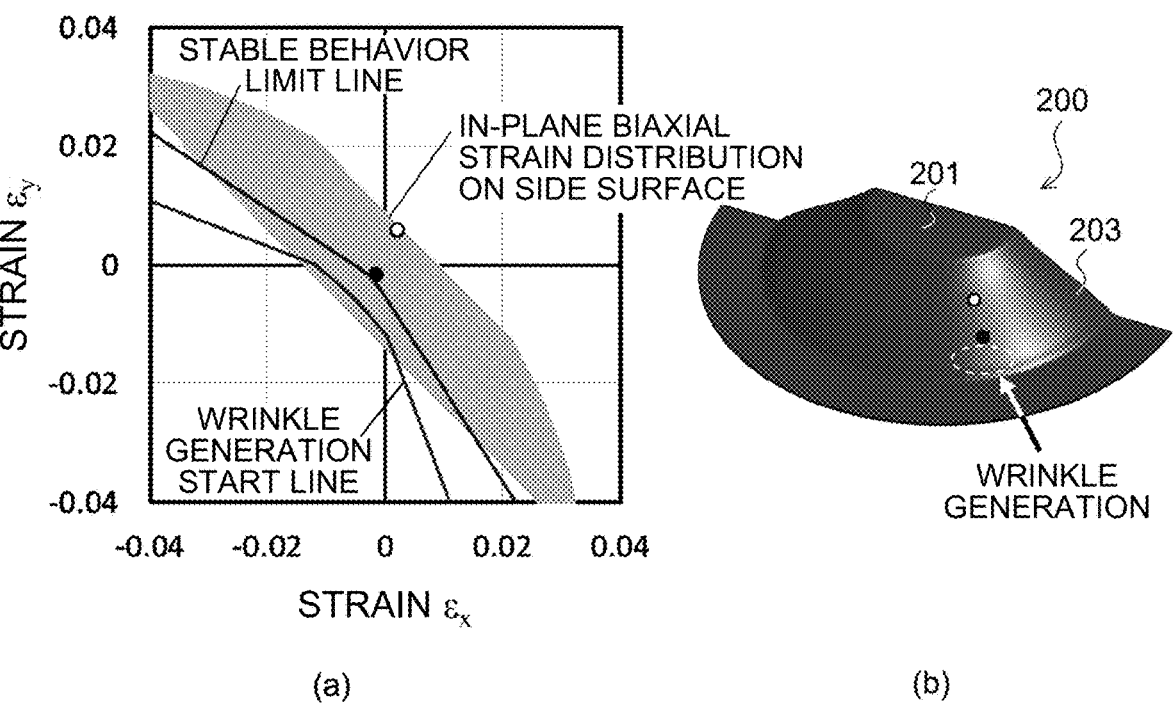

(a) of FIG. 15 is a diagram plotting strains in the in-plane biaxial directions in a side surface portion of a press formed part having a forming height of 40 mm on a wrinkle generation determination map, and a (b) of FIG. 15 is a diagram illustrating a shading diagram of the press formed part and positions ($\bigcirc$ and $\bullet$) where wrinkle generation has been determined in an example.

Figure 16:
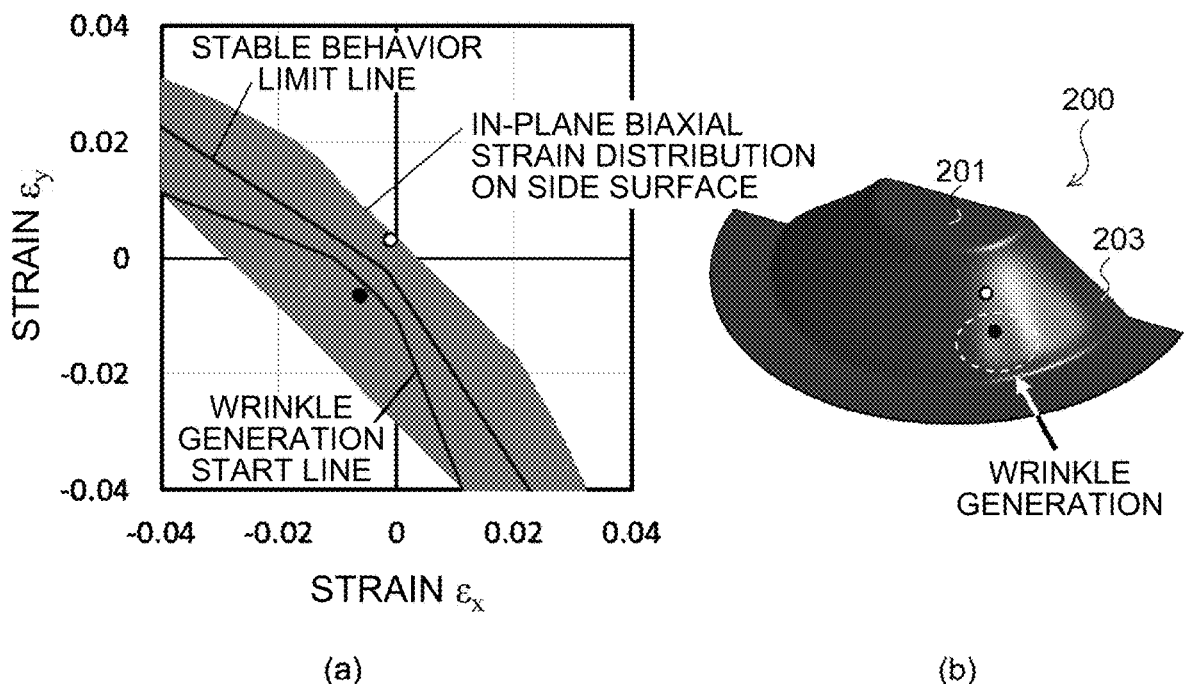

(a) of FIG. 16 is a diagram plotting strains in the in-plane biaxial directions in a side surface portion of a press formed part having a forming height of 50 mm on a wrinkle generation determination map, and a (b) of FIG. 16 is a diagram illustrating a shading diagram of the press formed part and positions ($\bigcirc$ and $\bullet$) where wrinkle generation has been determined in an example.

Figure 17:
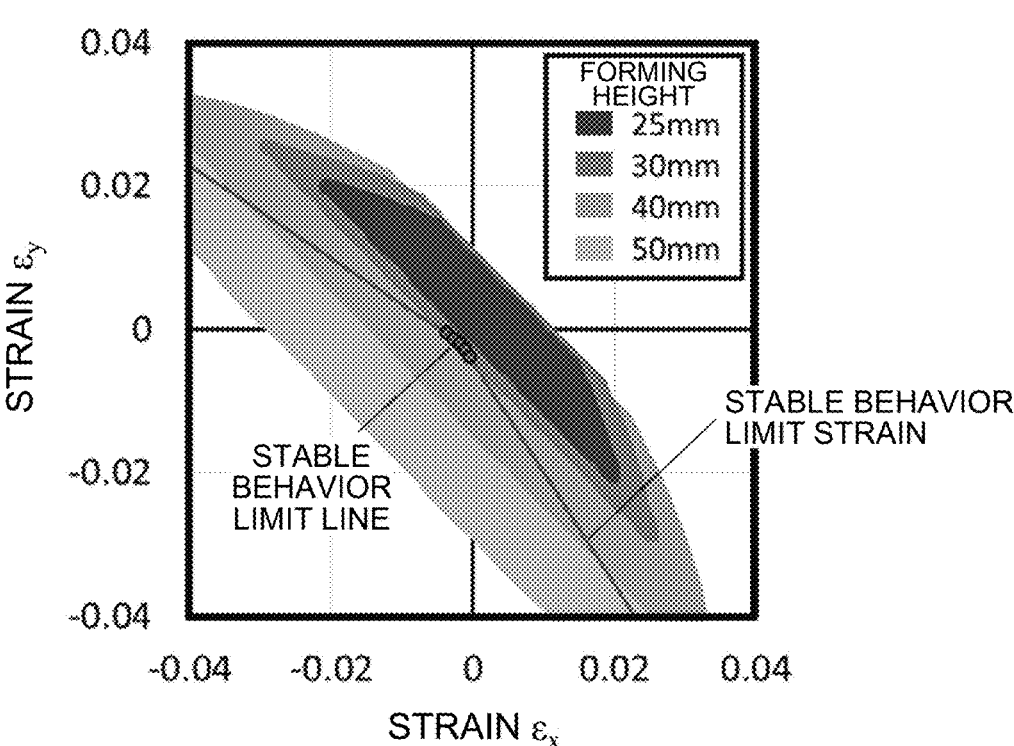

FIG. 17 is a diagram indicating a distribution of strains in the in-plane biaxial directions in side surface portions of press formed parts having forming heights of 25 mm, 30 mm, 40 mm, and 50 mm on a wrinkle generation determination map based on a stable behavior limit line in an example.

Figure 18:
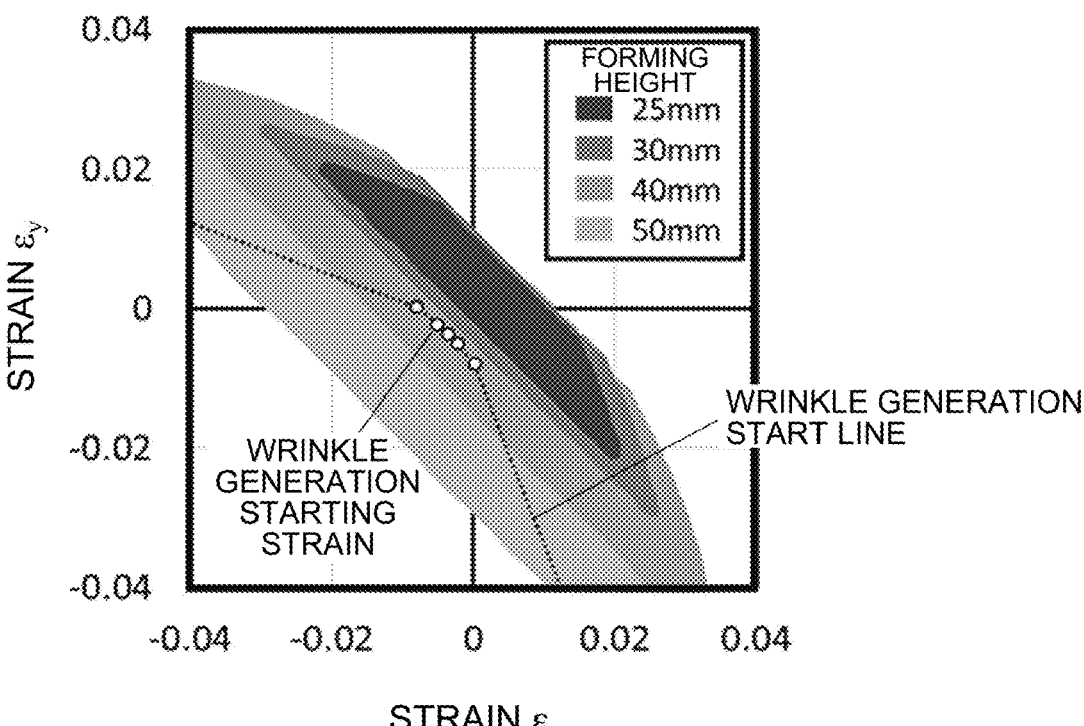

FIG. 18 is a diagram indicating a distribution of strains in the in-plane biaxial directions in side surface portions of press formed parts having forming heights of 25 mm, 30 mm, 40 mm, and 50 mm on a wrinkle generation determination map based on a wrinkle generation start line in an example.

Figure 19:
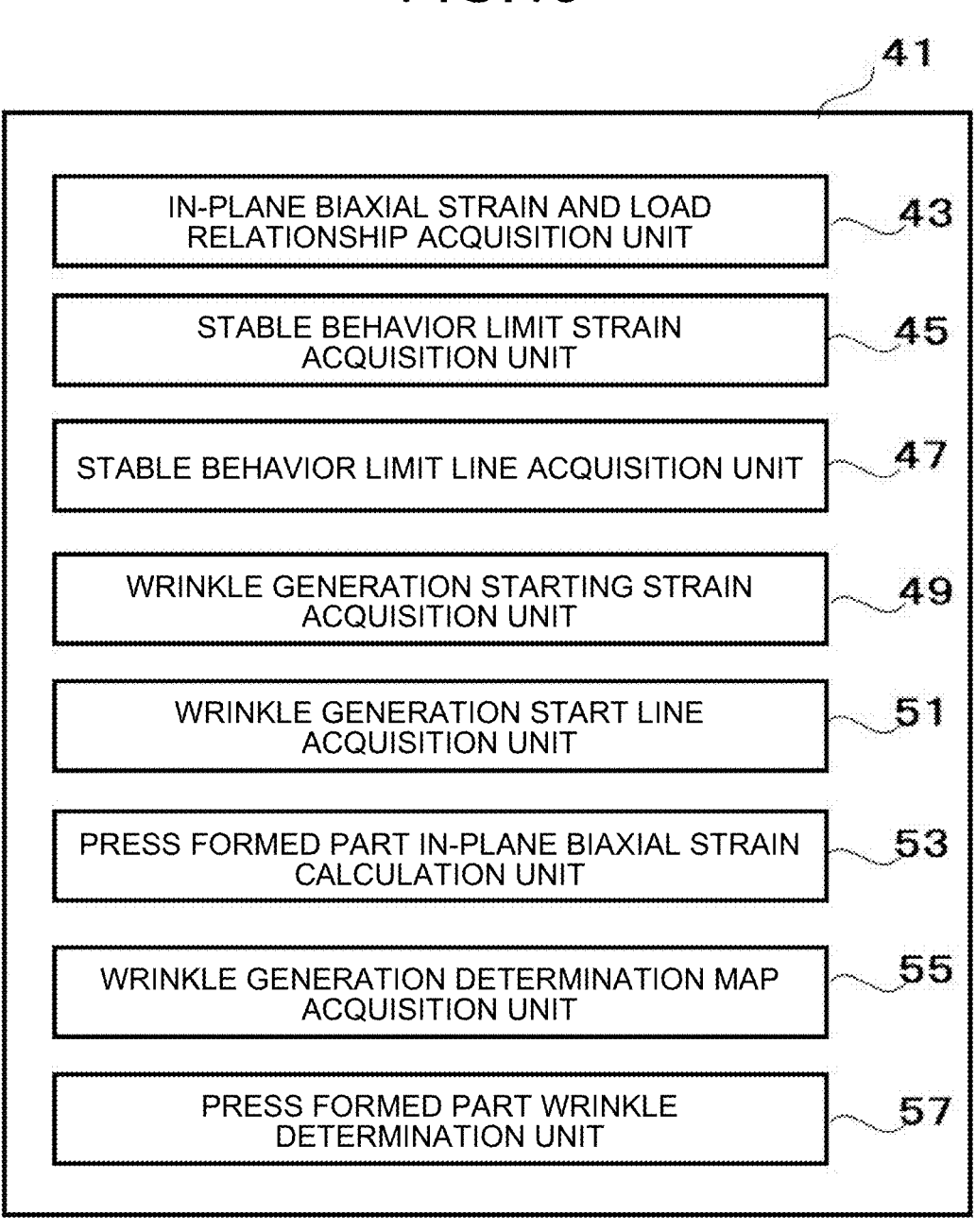

FIG. 19 is a block diagram of a wrinkle generation determination device for a press formed part according to the embodiment of the present invention, and a diagram illustrating a function of a wrinkle generation determination program for a press formed part according to the embodiment of the present invention.

DESCRIPTION OF EMBODIMENTS

Hereinafter, prior to describing a wrinkle generation determination index acquisition method, a wrinkle generation determination method, a wrinkle generation determination device, and a wrinkle generation determination program for a press formed part according to an embodiment of the present invention (a first embodiment), a cruciform test piece for biaxial test used as a target of a biaxial stress test in the present invention will be described.
<Cruciform Test Piece for Biaxial Test>

Figure 2:
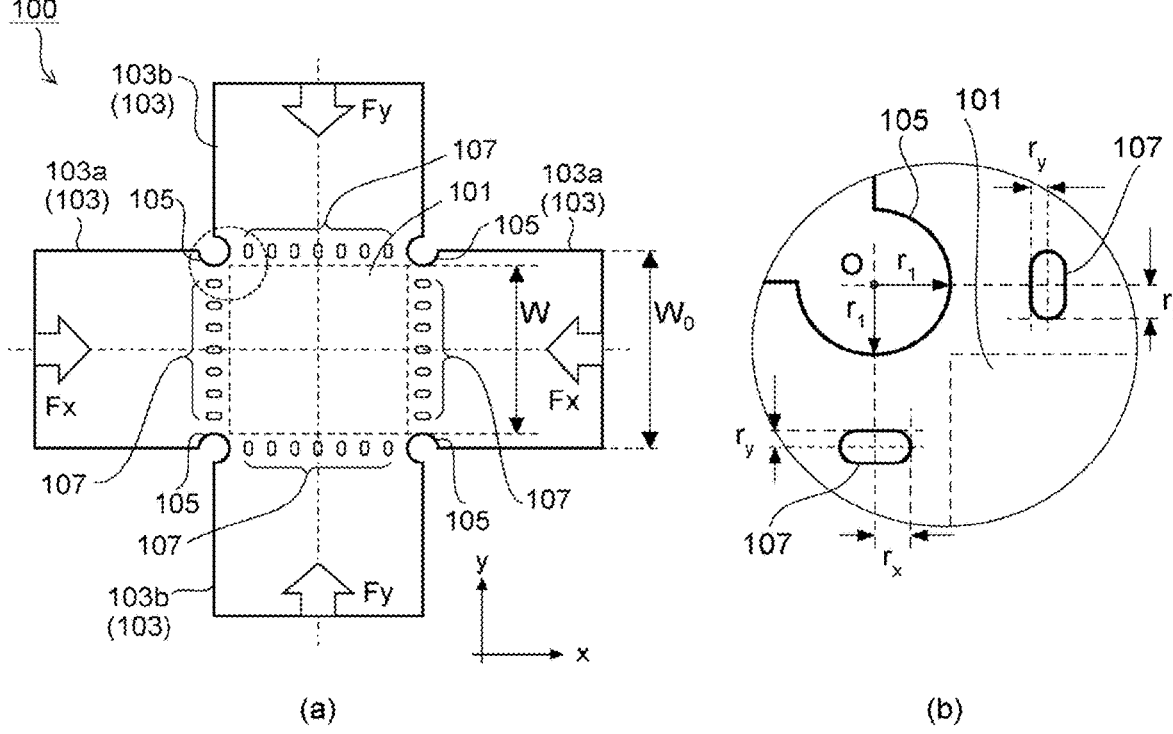
FIG. 2 is a diagram illustrating an example of a cruciform test piece for biaxial test used in the wrinkle generation determination index acquisition method for a press formed part according to the present embodiment.

As illustrated in FIG. 2 as an example, a cruciform test piece for biaxial test 100 has a cross shape in in-plane biaxial directions, and includes a measurement part 101 with a quadrangle shape at a center of the cross shape, and four piece parts 103 extending in the in-plane biaxial directions from four sides of the measurement part 101.

In a biaxial stress test, the measurement part 101 is a portion to be measured for strain, stress, and the like after inducing out-of-plane buckling in a portion facing an opening 17 provided in a center part 13*a* of a central tool 11*a* described later. Note that the quadrangle shape of the measurement part 101 is square in FIG. 2, but in the present invention, the measurement part may be rectangular.

The piece parts 103 include a pair of piece parts 103*a* and a pair of piece parts 103*b* facing each other with the measurement part 101 therebetween. A direction (x-axis direction in FIG. 2) in which the pair of piece parts 103*a* extend and a direction (y-axis direction in FIG. 2) in which the pair of piece parts 103*b* extend with the measurement part 101 therebetween are orthogonal to each other in the measurement part 101. These directions correspond to the in-plane biaxial directions in which a predetermined load is applied to the measurement part 101 of the cruciform test piece for biaxial test 100.

In other words, it is possible to perform a biaxial compression test in which the measurement part 101 is in a biaxial compression condition by applying a compressive load in the in-plane biaxial directions to the measurement part 101 via the pair of piece parts 103*a* and the pair of piece parts 103*b*.

Alternatively, by applying the compressive load to the measurement part 101 through one piece part 103*a* and applying a tensile load to the measurement part 101 through the other piece part 103*b*, it is possible to perform a tensile-compression test in which the measurement part 101 is in a tensile-compression condition.

Furthermore, by applying the compressive load to the other piece part 103*b* (or the pair of piece parts 103*a*) without applying a load to the pair of piece parts 103*a* (or the pair of piece parts 103*b*), it is possible to perform a uniaxial compression test in which the measurement part is in a uniaxial compression condition.

Then, by attaching a strain gauge to the measurement part 101, it is possible to measure the strain of the measurement part 101 under the biaxial stress condition (biaxial compression condition, tensile-compression condition, and uniaxial compression condition).

As described in the following reference literature, the cruciform test piece for biaxial test 100 illustrated in FIG. 2 includes a circular notch portion 105 obtained by notching each corner of the cross shape into a circular shape, and a plurality of hole-shaped portion 107 provided on each line connecting centers of the circular notch portions 105 adjacent to each other surrounding the measurement part 101 (Reference literature: JP 2019-35603 A).

The circular notch portion 105 prevents the piece parts 103*a* and the piece parts 103*b* from bulging and folding the corners when the compressive load in the in-plane biaxial directions is applied to the measurement part 101 via each of the piece parts 103*a* and the piece parts 103*b*, and makes it possible to generate a compressive strain, which is required for measuring mechanical property, in the measurement part 101.

The hole-shaped portion 107 disperses local stress concentration in the measurement part 101 to reduce variations in stress.

However, the biaxial stress test in the present invention is not limited to the use of the cruciform test piece for biaxial test 100 having the shape illustrated in FIG. 2. The shape and dimension of the cruciform test piece for biaxial test 100 may be appropriately changed according to conditions (load ratio, etc.) of the biaxial stress test regardless of the presence of the circular notch portions 105 and the hole-shaped portions 107.

[Wrinkle Generation Determination Index Acquisition Method for Press Formed Part]

Figure 1:
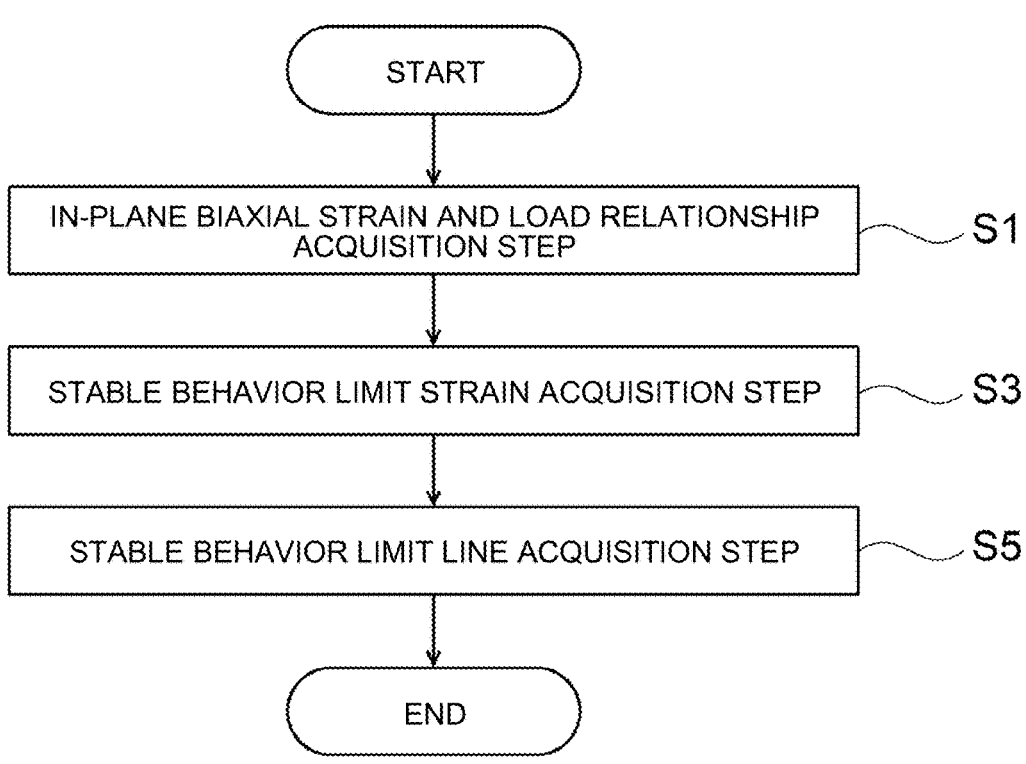
FIG. 1 is a diagram illustrating a processing flow of a wrinkle generation determination index acquisition method for a press formed part according to the present embodiment.

The wrinkle generation determination index acquisition method for a press formed part according to the embodiment of the present invention obtains an index for determining the presence of wrinkle generation under the biaxial stress condition in the press forming process of the press formed part by the biaxial stress test that induces out-of-plane buckling in the measurement part 101 by applying the load in the in-plane biaxial directions, including at least the compressive load in the in-plane uniaxial direction, to the measurement part 101 where the cross shape of the cruciform test pieces for biaxial test 100, as illustrated in FIG. 2 as an example, intersects in the in-plane biaxial directions. As illustrated in FIG. 1, the wrinkle generation determination index acquisition method for a press formed part according to the embodiment of the present invention includes an in-plane biaxial strain and load relationship acquisition step S1, a stable behavior limit strain acquisition step S3, and a stable behavior limit line acquisition step S5. Each of the above steps will be described below.

<<In-Plane Biaxial Strain and Load Relationship Acquisition Step>>

In the in-plane biaxial strain and load relationship acquisition step S1, a load ratio in the in-plane biaxial directions acting on the measurement part 101 in the biaxial stress test is changed. Then, in a process of inducing the out-of-plane buckling in the measurement part 101, a relationship between the load and the in-plane biaxial strain generated in the measurement part 101 and is acquired for each load ratio.

Figure 3:
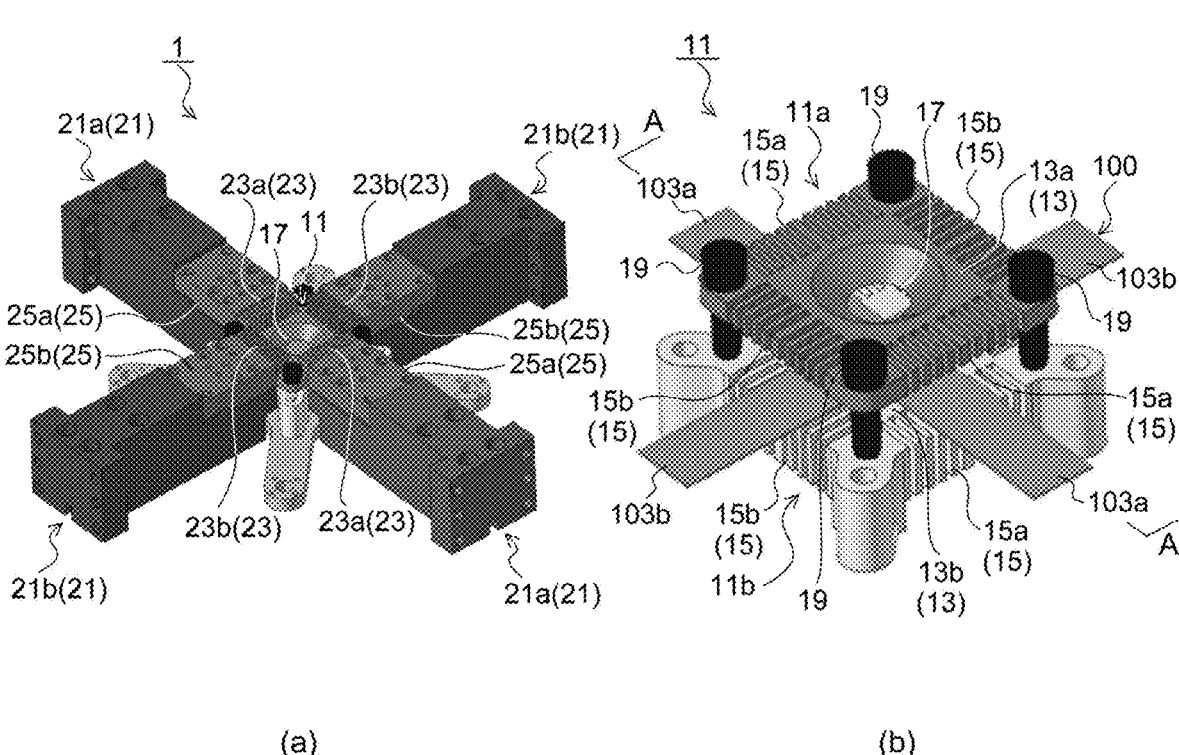
FIG. 3 is a diagram illustrating an example of a biaxial stress testing device used for a biaxial stress test of the cruciform test piece for biaxial test in the wrinkle generation determination index acquisition method for a press formed part according to the present embodiment.
Figure 4:
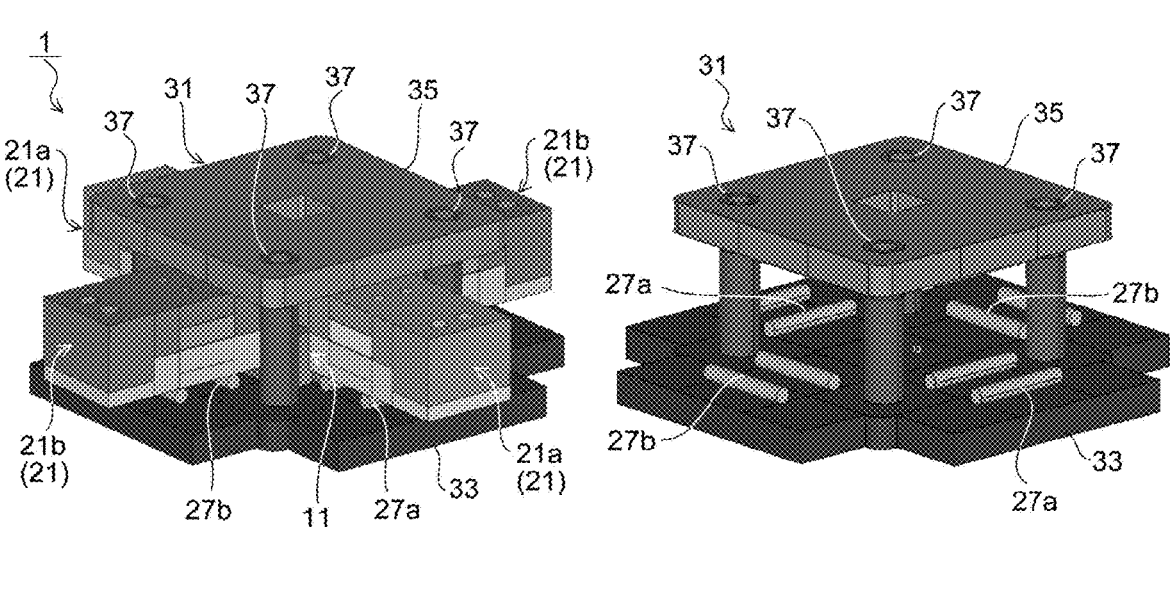
FIG. 4 is a diagram illustrating a central tool and a press mechanism of a side tool of the biaxial stress testing device according to the embodiment of the present invention ((a) State in which the press mechanism is installed in the central tool and the side tool and (b) press mechanism).

In the in-plane biaxial strain and load relationship acquisition step S1, as illustrated in FIGS. 3 and 4 as an example, the biaxial stress test of the cruciform test piece for biaxial test 100 may be performed using a biaxial stress testing device 1 including a central tool 11, a side tool 21, and a press mechanism 31.

As illustrated in FIG. 3, the central tool 11 has a quadrangle center part 13 facing the measurement part 101 where the cross shape of the cruciform test piece for biaxial test 100 intersects, and a first comb-shape part 15 formed on an edge on four sides of the center part 13, and includes a pair of central tool 11*a* and central tool 11*b* that sandwich both surfaces of the cruciform test piece for biaxial test 100.

The first comb-shape part 15 includes a pair of first comb-shape parts 15*a* and a pair of first comb-shape parts 15*b* formed on edges of two opposing sides of the quadrangle central tool 11. A direction in which the pair of first comb-shape parts 15*a* facing each other are disposed and a direction in which the pair of first comb-shape parts 15*b* facing each other are disposed are orthogonal to each other at the center part 13. As illustrated in FIG. 2, these directions correspond to the in-plane biaxial directions (x-axis direction and y-axis direction in FIG. 2) in which the compressive load or the tensile load is applied to the measurement part 101 via the pair of piece parts 103*a* or the pair of piece parts 103*b* of the cruciform test piece for biaxial test 100.

Further, the opening 17 is formed in the center part 13*a* of one of the central tools 11*a* of the pair of central tools 11 so as to give a degree of freedom in shape deformation of the measurement part 101 when the out-of-plane buckling is induced. In addition, as illustrated in FIG. 3, in order to prevent movement of the cruciform test piece for biaxial test

100 in the in-plane direction, four corners of the central tool 11 are fixed to a base 33 of the press mechanism 31 (FIG. 4) by bolts 19.

As illustrated in FIG. 3, the side tool 21 has a second comb-shape part 23 with comb shape that is disposed on four sides of the central tool 11 and engages with the first comb-shape part 15 and a holding part 25 that holds the piece part 103 of the cruciform test piece for biaxial test 100, and includes a pair of side tools 21*a* and a pair of side tools 21*b* that are disposed with the central tool 11 therebetween.

The side tool 21*a* includes a second comb-shape part 23*a* that detachably engages with the first comb-shape part 15*a* of the central tool 11, and a holding part 25*a* that holds the piece part 103*a* of the cruciform test piece for biaxial test 100.

The side tool 21*b* includes a second comb-shape part 23*b* that detachably engages with the first comb-shape part 15*b* of the central tool 11, and a holding part 25*b* that holds the piece part 103*b* of the cruciform test piece for biaxial test 100.

As described above, the side tool 21 moves while the second comb-shape part 23 engages with the first comb-shape part 15, whereby buckling of the piece part 103 can be suppressed in a process of applying the compressive load to the cruciform test piece for biaxial test 100 via the piece part 103.

In the present embodiment, as illustrated in FIG. 4, the side tools 21*a* and the side tools 21*b* are respectively installed on rollers 27*a* and 27*b* provided on an upper surface of the base 33 of the press mechanism 31, and the second comb-shape parts 23*a* and 23*b* can move in the in-plane uniaxial direction in a state of being engaged with the first comb-shape parts 15*a* and 15*b* of the central tool 11.

The press mechanism 31 applies, as a clamping force applying unit, a predetermined clamping force in a sheet thickness direction of the cruciform test piece for biaxial test 100 so that the second comb-shape parts 23*a* engaged with the first comb-shape parts 15*a* and the second comb-shape parts 23*b* engaged with the first comb-shape parts 15*b* can be inserted and removed. The press mechanism 31 includes the base 33, a top plate 35, and a guide pin 37 as illustrated in FIG. 4.

In the press mechanism 31, by applying a pressing force to the base 33 from above the top plate 35 by the guide pins 37 at four corners, the predetermined clamping force can be applied in the sheet thickness direction of the cruciform test piece for biaxial test 100 in a manner such that the first comb-shape part 15 and the second comb-shape part 23 engaged can be inserted and removed. This is preferable for reliably preventing buckling distortion in the piece part 103. Note that at least the clamping force in the sheet thickness direction by the bolts 19 or the clamping force in the sheet thickness direction by the top plate 35 may be used.

Figure 5:
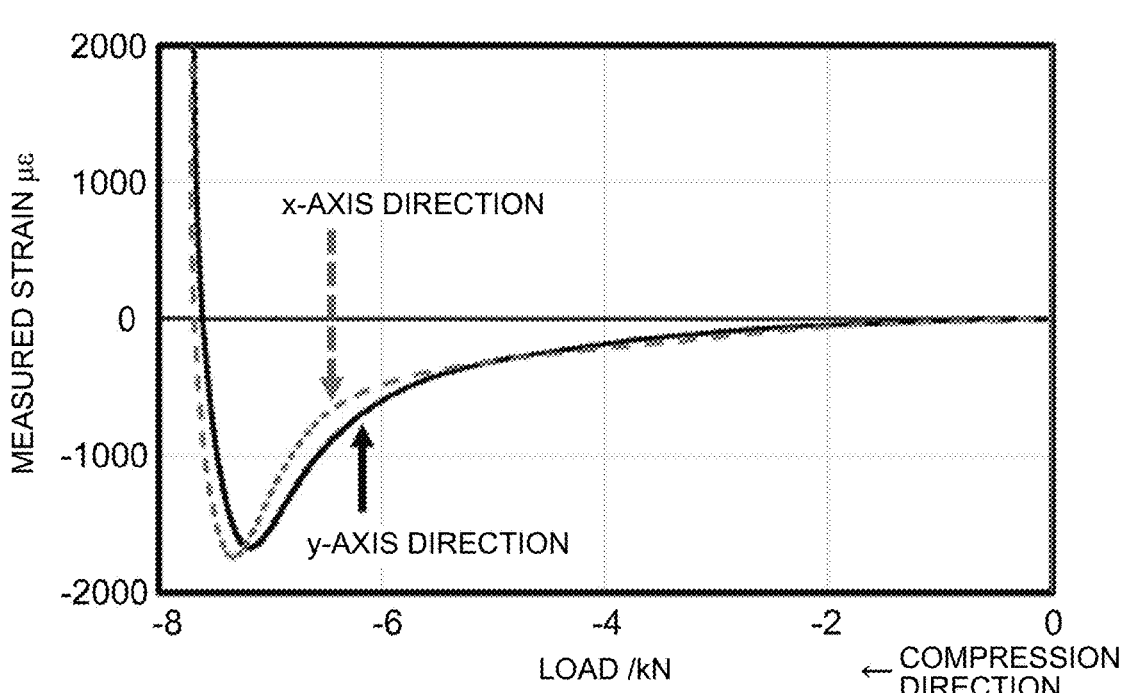
FIG. 5 is an example of a strain-load diagram when a compressive load in in-plane biaxial directions (x-axis direction and y-axis direction) is applied to the cruciform test piece for biaxial test in the wrinkle generation determination index acquisition method for a press formed part according to the present embodiment.

FIG. 5 is an example of a graph illustrating, in the process of inducing the out-of-plane buckling in the measurement part 101 in the biaxial stress test, the relationship between the in-plain biaxial strain generated in the measurement part 101 and the load. The biaxial stress test uses the biaxial stress testing device 1 in which a load ratio in the in-plane biaxial directions (x-axis direction and y-axis direction in FIG. 2) is −1:−1 on the measurement part 101 of the cruciform test piece for biaxial test 100.

<<Stable Behavior Limit Strain Acquisition Step>>

In the stable behavior limit strain acquisition step S3, a primary differential coefficient of in-plane uniaxial strain on which the compressive load acts is calculated for each load ratio from the relationship between the in-plane biaxial stress and the load acquired for each load ratio in the in-plane biaxial strain and load relationship acquisition step S1. A point at which the calculated primary differential coefficient of the strain becomes the local maximum is obtained as a stable behavior limit point that will be a starting point of the out-of-plane buckling. Then, an in-plane biaxial strain of the measurement part 101 at the stable behavior limit point is acquired as a stable behavior limit strain.

Figure 6:
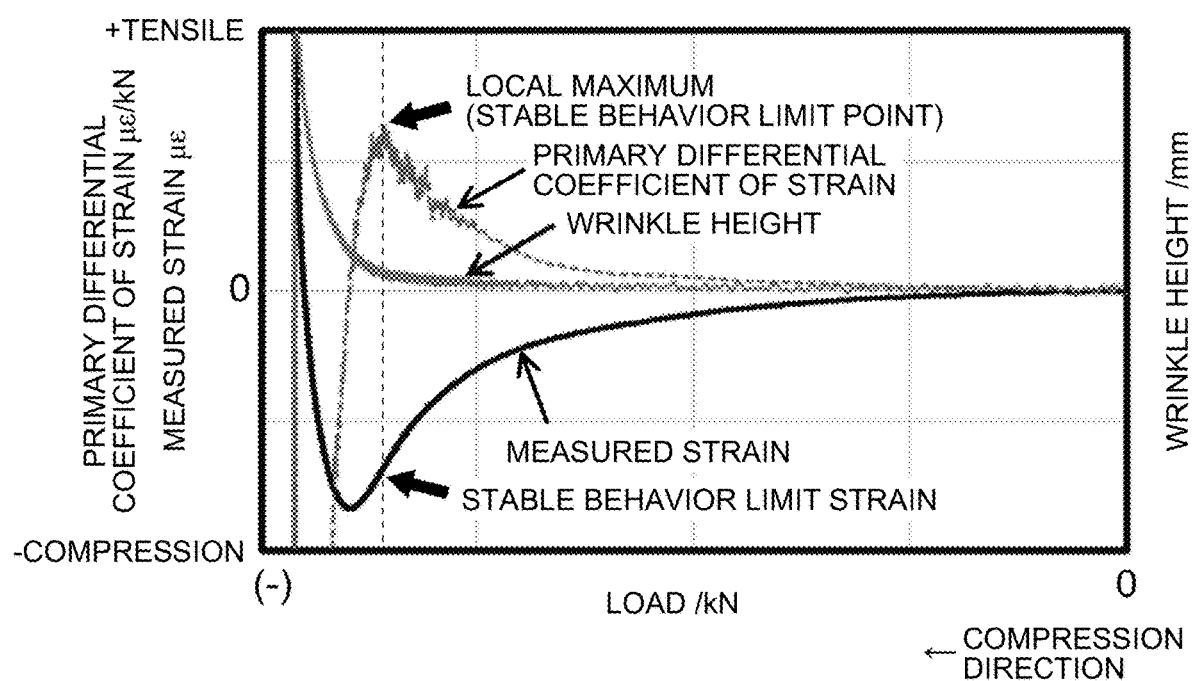
FIG. 6 is a graph illustrating an example of a relationship between strain, load, and wrinkle height in an in-plane uniaxial direction to which the compressive load is applied in the biaxial stress test in which out-of-plane buckling is induced in a measurement part of the cruciform test piece for biaxial test, and a diagram illustrating a stable behavior limit point obtained from the relationship between the strain and the load according to the present embodiment.

FIG. 6 illustrates an example of a result obtained by calculating the primary differential coefficient of the in-plane uniaxial (y-axis direction) strain on which the compressive load acts in the biaxial stress test at the load ratio of −1:−1 in the in-plane biaxial directions (x-axis direction and y-axis direction in FIG. 2 (*a*)), and obtaining a point at which the calculated primary differential coefficient of strain becomes the local maximum as the stable behavior limit point. In FIG. 6, a horizontal axis represents the load (plus is tensile load and minus is compressive load) applied to the cruciform test piece for biaxial test 100, a left vertical axis represents a measured strain (plus is tensile strain, and minus is compressive strain) by the strain gauge and the primary differential coefficient of strain with respect to the compressive load, and a right vertical axis represents a wrinkle height that is a deformation amount of the measurement part 101 in the sheet thickness direction (out-of-plane direction).

In the biaxial stress test, when the compressive load at least in the in-plane uniaxial direction is gradually applied to the measurement part 101 of the cruciform test piece for biaxial test 100, the compressive strain is accumulated in the measurement part 101. However, the accumulation of the compressive strain with respect to the compressive load eventually slows down, and the out-of-plane deformation occurs in the measurement part 101. The stable behavior limit point indicates a time point at which this accumulation of compressive strain with respect to the compressive load starts to slow down, and can be regarded as a starting point indicating a first sign of the out-of-plane buckling that appears in the measurement part 101. In other words, when the compressive load is applied to the measurement part 101 of the cruciform test piece for biaxial test 100 and the strain on the measurement part 101 reaches the stable behavior limit point, faint wrinkles that can be felt by palpation is generated in the measurement part 101, although the wrinkles cannot be obviously recognized visually.

As illustrated in FIG. 5, in the relationship between the in-plane biaxial strain and the load when the compressive load in the in-plane biaxial directions is applied to the measurement part 101 in the biaxial stress test, a point at which the primary differential coefficient of strain becomes the local maximum in an absolute value of a smaller strain may be obtained as the stable behavior limit point. Or, the stable behavior limit point may be obtained by averaging or adding each of the in-plane biaxial strain and the load.

<<Stable Behavior Limit Line Acquisition Step>>

In the stable behavior limit line acquisition step S5, the stable behavior limit strain in the in-plane biaxial directions acquired for each load ratio in the stable behavior limit strain acquisition step S3 is plotted on two-dimensional coordinates. The plotted stable behavior limit strains are connected to obtain a stable behavior limit line that will be a wrinkle generation index under the biaxial stress condition.

Figure 7:
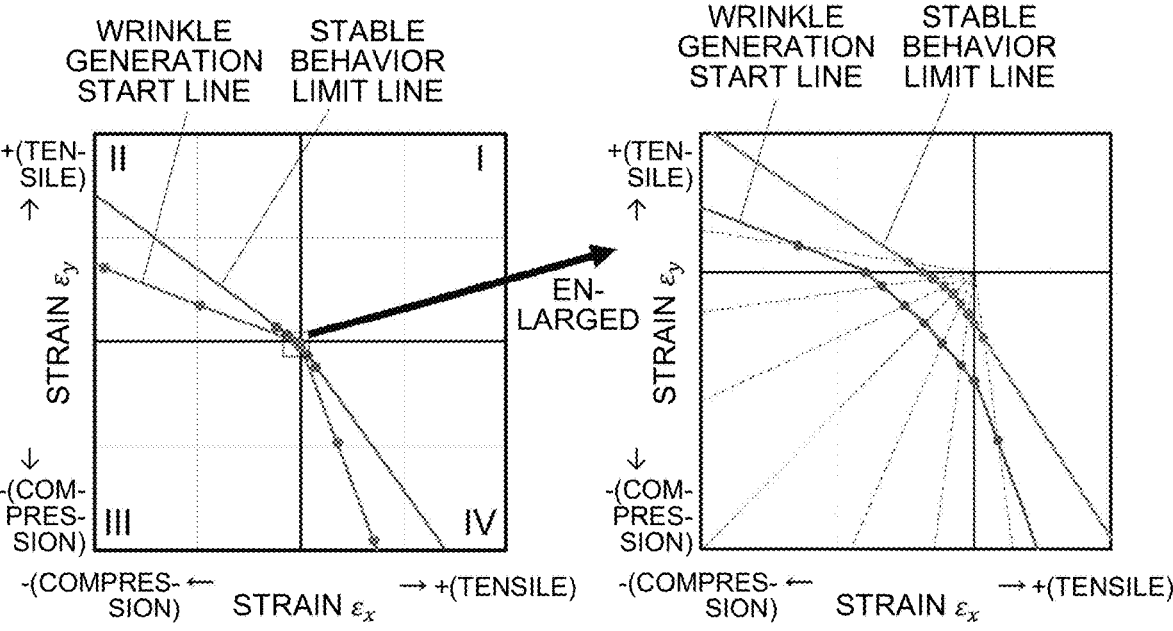
FIG. 7 is a graph plotting, on two-dimensional coordinates, stable behavior strains and wrinkle generation starting strains obtained by changing in the biaxial stress test a load ratio in the in-plane biaxial directions acting on the cruciform test piece for biaxial test to explain a stable behavior limit line obtained by connecting the stable behavior strains and a wrinkle generation start line obtained by connecting the wrinkle generation starting strains according to the present embodiment.

FIG. 7 illustrates an example of a result of plotting, on the two-dimensional coordinates, the stable behavior limit strain in the in-plane biaxial directions acquired for each load ratio in the biaxial stress test using the cruciform test piece for biaxial test 100, and obtaining the stable behavior limit line.

In FIG. 7, an origin indicates the strain ($\varepsilon_x=0$, $\varepsilon_y=0$) on the measurement part 101 at the start of the biaxial stress test. Negative values of $\varepsilon_x$ and $\varepsilon_y$ represent the compressive strain and positive values represent the tensile strain. In the two-dimensional coordinates illustrated in FIG. 7, a negative region ($\varepsilon_x<0$, $\varepsilon_y=0$) on the horizontal axis and a negative region ($\varepsilon_x=0$, $\varepsilon_y<0$) on the vertical axis indicate a uniaxial compression condition. A first quadrant ($\varepsilon_x>0$, $\varepsilon_y>0$) indicates a tensile-tensile condition, a third quadrant ($\varepsilon_x<0$, $\varepsilon_y<0$) indicates a biaxial compression condition, and a second quadrant ($\varepsilon_x<0$, $\varepsilon_y>0$) and a fourth quadrant ($\varepsilon_x>0$, $\varepsilon_y<0$) indicate a tensile-compression condition. Further, in FIG. 7, a broken line indicates a straight path (strain path) with a constant plastic strain ratio at each load ratio when the load in the in-plane biaxial directions is applied to the cruciform test piece for biaxial test 100 with a constant load ratio in the biaxial stress test.

Here, with respect to a relationship between the stable behavior limit strain and the load ratio, the out-of-plane buckling in the measurement part 101 occurs when the in-plane biaxial strain is in a region from the second quadrant to the fourth quadrant, i.e., when at least $\varepsilon_x$ or $\varepsilon_y$ is the compressive strain. The out-of-plane buckling in the measurement part 101 does not occur when the in-plane biaxial strain is in the first quadrant, i.e., when both $\varepsilon_x$ and $\varepsilon_y$ are the tensile strain.

From the relationship between the stable behavior limit line and the strain path at each load ratio illustrated in FIG. 7, the out-of-plane buckling, in the biaxial compression condition (third quadrant), occurs in a compressive strain lower than that in the uniaxial compression condition (on horizontal axis ($\varepsilon_x$) and vertical axis ($\varepsilon_y$)). In addition, in the tensile-compression condition (second quadrant and fourth quadrant), the out-of-plane buckling does not occur until the compressive strain becomes higher than that in the uniaxial compression condition. As described above, by plotting the stable behavior limit strains in the in-plane biaxial direction obtained from the result of the biaxial stress test on the two-dimensional coordinates having the in-plane biaxial strains as the coordinate axes and connecting the stable behavior limit strains, it is possible to obtain the stable behavior limit line that will be the index of the starting point of the out-of-plane buckling in various biaxial stress conditions and uniaxial compression conditions.

In the above description, the stable behavior limit line that will be a wrinkle generation index is obtained based on the stable behavior limit strain that is the starting point of the occurrence of the out-of-plane buckling in the measurement part 101 in the biaxial stress test using the cruciform test piece for biaxial test 100 having the cross shape. However, when the compressive load is further applied to the measurement part 101 after the strain in the measurement part 101 exceeds the stable behavior limit point, as illustrated in FIG. 6, the compressive strain accumulated in the measurement part 101 is released at once. As a result, the out-of-plane buckling occurs, and the compressive strain in the measurement part 101 changes to the tensile strain.

Therefore, as another aspect of the present embodiment (a second embodiment), the in-plane biaxial strain when the compressive strain accumulated in the measurement part 101 is released at once and the out-of-plane buckling occurs in the measurement part 101 may be obtained as an index for determining the presence of obvious wrinkle generation.

Figure 8:
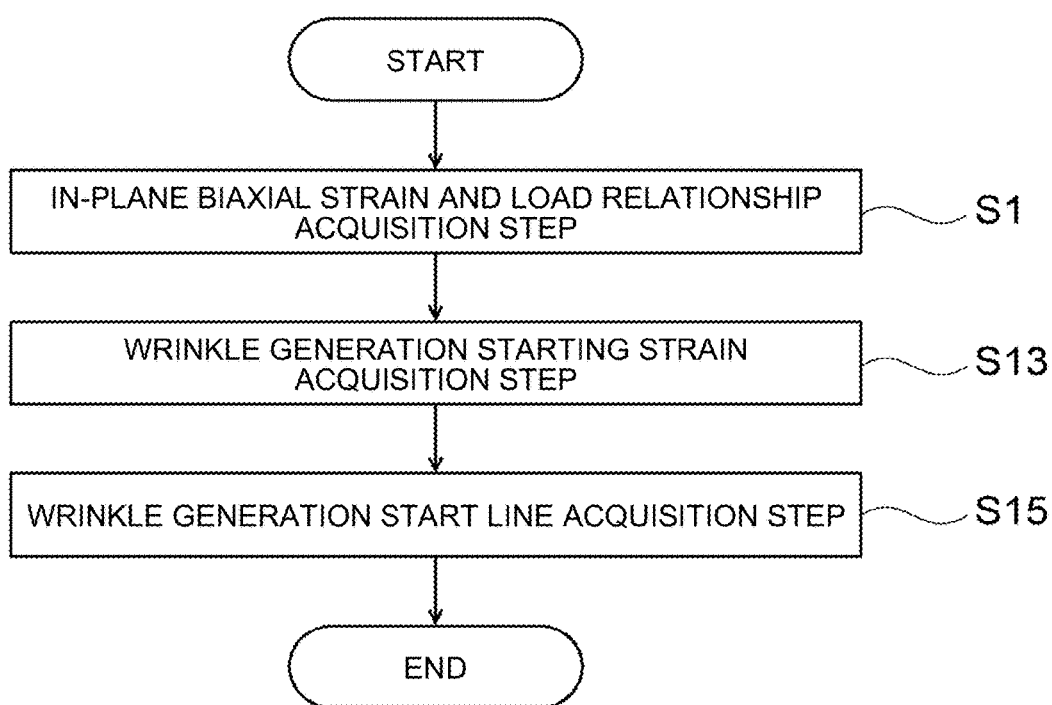
FIG. 8 is a diagram illustrating a processing flow of a wrinkle generation determination index acquisition method for a press formed part according to another aspect of the present embodiment.

Similarly to the first embodiment, a wrinkle generation determination index acquisition method for a press formed part according to the another aspect of the present embodiment obtains the index for determining the presence of wrinkle generation under the biaxial stress condition in the press forming process of the press formed part by the biaxial stress test in which the out-of-plane buckling is induced in the measurement part 101 of the cruciform test piece for biaxial test 100 having the cross shape illustrated in FIG. 2. As illustrated in FIG. 8, the wrinkle generation determination index acquisition method for a press formed part according to the another aspect of the present embodiment includes an in-plane biaxial strain and load relationship acquisition step S1, a wrinkle generation starting strain acquisition step S13, and a wrinkle generation start line acquisition step S15. Here, since the in-plane biaxial strain and load relationship acquisition step S1 is the same as that in the first embodiment described above, the wrinkle generation starting strain acquisition step S13 and the wrinkle generation start line acquisition step S15 will be described below.

<<Wrinkle Generation Starting Strain Acquisition Step>>

In the wrinkle generation starting strain acquisition step S13, from the relationship between the in-plane biaxial strain and the load acquired for each load ratio in the in-plane biaxial strain and load relationship acquisition step S1, a point at which a polarity of an increment of the strain with respect to an increment of the compressive load is reversed in a relationship between the in-plane uniaxial strain on which the compressive load acts and the load is obtained for each load ratio as a wrinkle generation starting point. Then, the in-plane biaxial strain in the measurement part 101 at the wrinkle generation starting point is acquired as the wrinkle generation starting strain.

Figure 9:
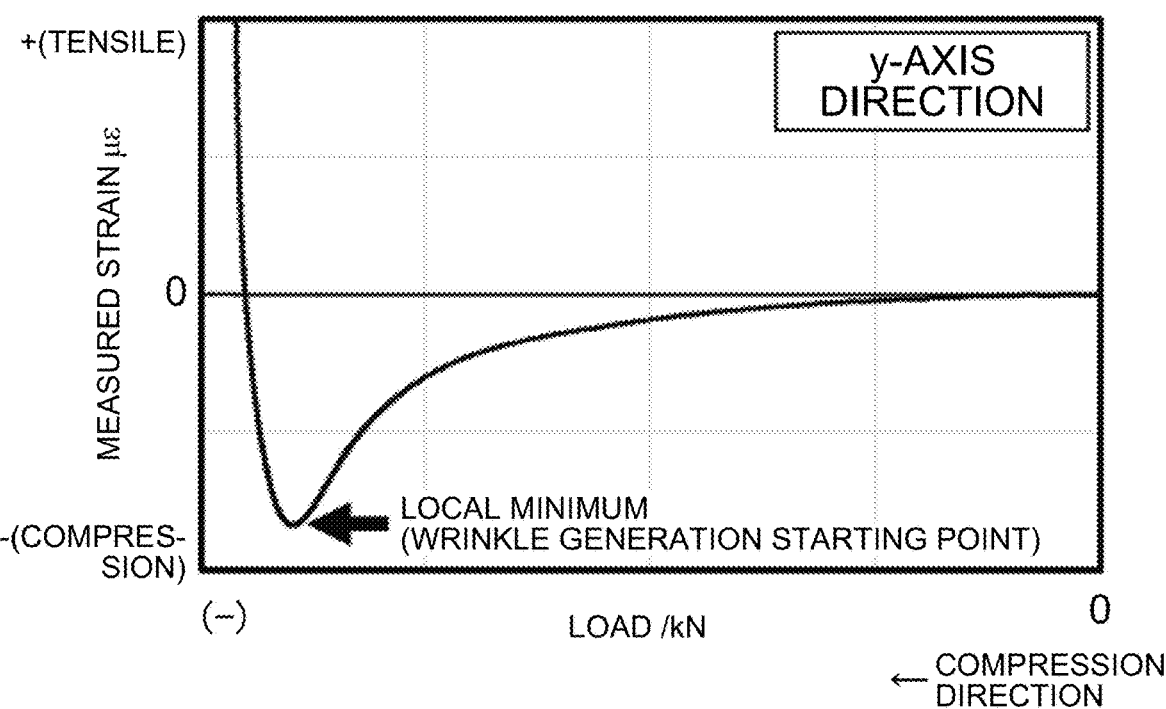
FIG. 9 is a diagram illustrating a wrinkle generation starting point obtained from a relationship between a strain in an in-plane uniaxial direction and a load in which a compressive load is applied to a measurement part of a cruciform test piece for biaxial test in another aspect of the present embodiment.

FIG. 9 illustrates an example in which the wrinkle generation starting point is obtained from the relationship between the strain and the load in the measurement part 101 of the cruciform test piece for biaxial test 100 in the biaxial stress test at a load ratio of −1:−1. The wrinkle generation starting point corresponds to a timing at which faint wrinkles that can be recognized by palpation rapidly change into obvious wrinkles.

<<Wrinkle Generation Start Line Acquisition Step>>

In the wrinkle generation start line acquisition step S15, the wrinkle generation starting strain in the in-plane biaxial directions acquired for each load ratio are plotted on the two-dimensional coordinates, and the plotted wrinkle generation starting strains are connected to obtain the wrinkle generation start line under the biaxial stress condition.

Aforementioned FIG. 7 illustrates results of plotting the wrinkle generation starting strain in the in-plane biaxial directions obtained for each load ratio on the two-dimensional coordinates to obtain the wrinkle generation start line.

As described above, when the load in the in-plane biaxial directions is started to be applied to the measurement part 101 of the cruciform test piece for biaxial test 100 having the cross shape, the strain in the measurement part 101 reaches the stable behavior limit line following the straight path (strain path) with constant plastic strain ratio. Here, occurrence of the out-of-plane buckling is not observed in the strain path from the origin to the stable behavior limit line. When the strain reaches the stable behavior limit line, a first sign of the out-of-plane buckling appears in the measurement part 101.

When the load in the in-plane biaxial directions is further applied to the measurement part 101 after reaching the stable behavior limit line, the strain in the measurement part 101 follows the strain path, exceeds the stable behavior limit line, and reaches the wrinkle generation start line. Here, in a range interposed between the stable behavior limit line and the wrinkle generation start line, the compressive strain is accumulated in the measurement part, and faint out-of-plane buckling (wrinkle) occurs in the measurement part 101, which is difficult to visually determine but can be confirmed by palpation.

Then, when the strain reaches the wrinkle generation start line, the compressive strain accumulated in the measurement part 101 is released at once, and faint wrinkles generated in the measurement part 101 turn into obvious wrinkles.

As described above, according to the wrinkle generation determination index acquisition method for a press formed part according to the other aspect of the present embodiment, as an index for determining the presence of wrinkle generation under the biaxial stress condition in the press forming process of the press formed part, it is possible to obtain the stable behavior limit line and the wrinkle generation start line indicated on the two-dimensional coordinates having the in-plane biaxial strains as the coordinate axes.

[Wrinkle Generation Determination Method for Press Formed Part]

Figure 10:
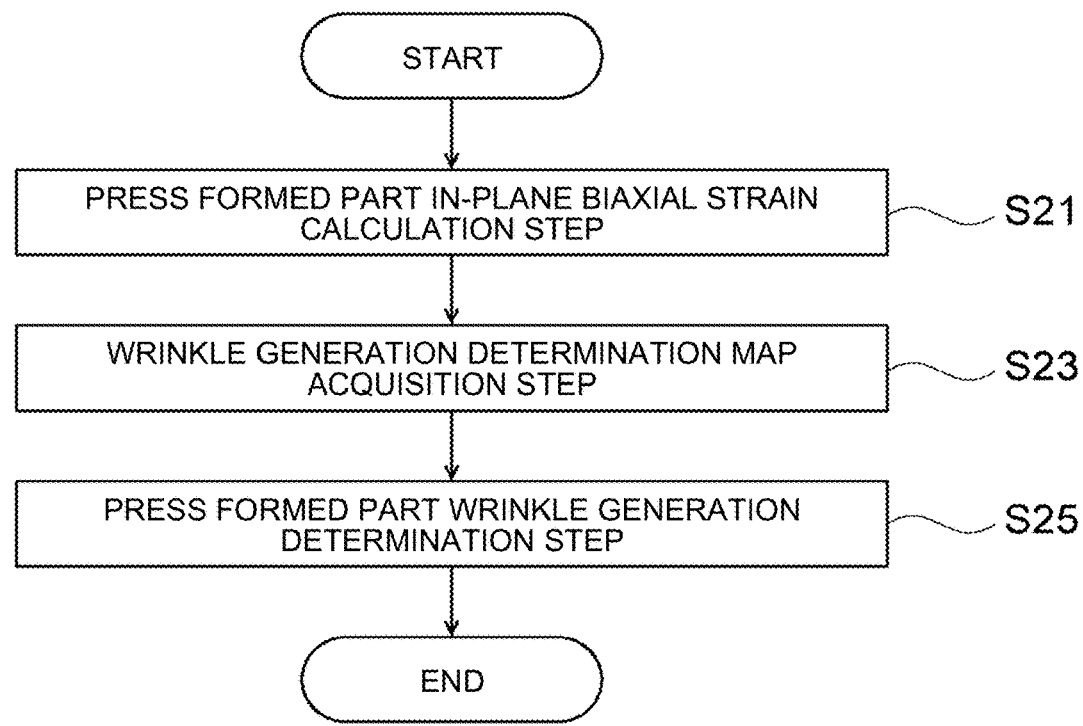
FIG. 10 is a diagram illustrating a processing flow of a wrinkle generation determination method for a press formed part according to the present embodiment.

A wrinkle generation determination method for a press formed part according to the embodiment of the present invention (a third embodiment) determines the presence of wrinkle generation in the press forming process of the press formed part by using the stable behavior limit line obtained by the wrinkle generation determination index acquisition method for a press formed part according to the present embodiment (the first embodiment), and the wrinkle generation start line obtained by the wrinkle generation determination index acquisition method for a press formed part according to the another aspect of the present embodiment (the second embodiment). As illustrated in FIG. 10, the wrinkle generation determination method for a press formed part according to the embodiment of the present invention includes a press formed part in-plane biaxial strain calculation step S21, a wrinkle generation determination map acquisition step S23, and a press formed part wrinkle generation determination step S25. Each of these steps will be described below.

<<Press Formed Part In-Plane Biaxial Strain Calculation Step>>

In the press formed part in-plane biaxial strain calculation step S21, press forming simulation of the press formed part is performed to obtain a strain in the in-plane biaxial directions in the press forming process of a predetermined portion of the press formed part.

The predetermined portion of the press formed part for acquiring the in-plane biaxial strain is not particularly limited, but it is preferable to select a portion where wrinkles may occur in the press forming process.

<<Wrinkle Generation Determination Map Acquisition Step>>

In the wrinkle generation determination map acquisition step S23, the stable behavior limit line and the wrinkle generation start line obtained by the method described in the first embodiment and the second embodiment are indicated on the two-dimensional coordinates having the in-plane biaxial strains as the coordinate axes. Then, a wrinkle generation determination map for determining the presence of wrinkle generation under the biaxial stress condition is acquired.

Figure 11:
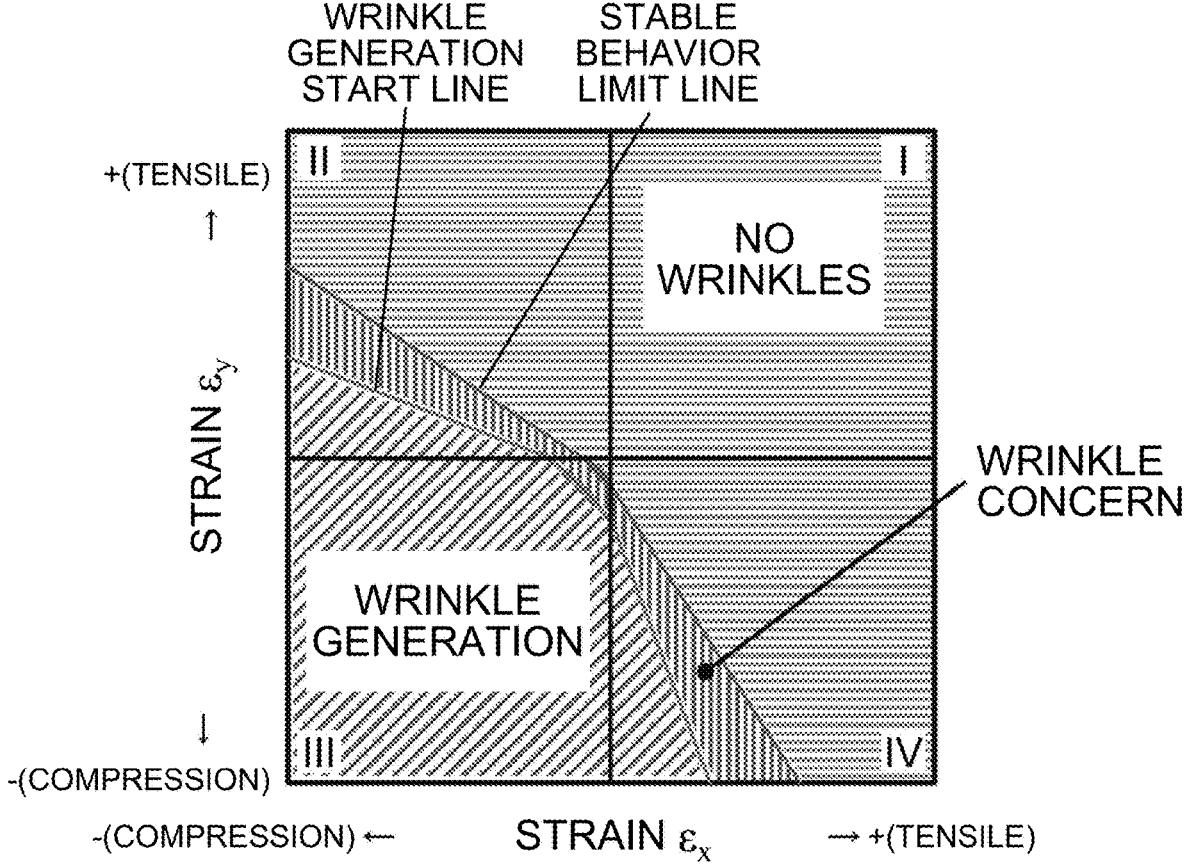
FIG. 11 is a diagram illustrating an example of a wrinkle generation determination map for determining the presence of wrinkle generation using a strain in in-plane biaxial directions obtained by press forming simulation in the wrinkle generation determination method for a press formed part according to the present embodiment.

FIG. 11 illustrates an example of the wrinkle generation determination map in which the stable behavior limit line and the wrinkle generation start line are indicated on the two-dimensional coordinates having the in-plane biaxial strains as the coordinate axes. In FIG. 11, a region where the in-plane biaxial strain is on the tensile side, with respect to the stable behavior limit line, indicates a region of a biaxial strain where no out-of-plane buckling occurs ("no wrinkles" in the drawing). In FIG. 11, a region between the stable behavior limit line and the wrinkle generation start line indicates a region where faint wrinkles that cannot be visually recognized are generated ("wrinkle concern" in the drawing). Further, in FIG. 11, a region where the in-plane biaxial strain is on the compression side, with respect to the wrinkle generation start line, indicates a region where obvious wrinkles are generated ("wrinkles" in the drawing).

<<Press Formed Part Wrinkle Generation Determination Step>>

In the press formed part wrinkle generation determination step S25, the in-plane biaxial strains in the predetermined portion of the press formed part obtained in the press formed part in-plane biaxial strain calculation step S21 are plotted on the wrinkle generation determination map acquired in the wrinkle generation determination map acquisition step S23. When plotting on the wrinkle generation determination map is located in the region between the stable behavior limit line and the wrinkle generation start line, it is determined that there is a high risk of wrinkle generation on the predetermined portion of the press formed part. When plotting is located on the compression side of the wrinkle generation start line, it is determined that wrinkles will be generated in the predetermined portion of the press formed part.

Effects of the press formed part wrinkle generation determination method according to a second embodiment will be demonstrated using an example described later.

[Wrinkle Generation Determination Device for Press Formed Part]

A wrinkle generation determination device 41 for a press formed part (hereinafter referred to as "wrinkle generation determination device 41") according to the embodiment of the present invention obtains, as illustrated in FIG. 2 as an example, the index for determining the presence of wrinkle generation under the biaxial stress condition in the press forming process of the press formed part by the biaxial stress test in which the load in the in-plane biaxial direction including at least the compressive load in the in-plane uniaxial direction is applied to the measurement part 101 whose cross shape of the cruciform test piece for biaxial test 100 intersects in the in-plane biaxial directions to induce the out-of-plane buckling in the measurement part 101. Then, the presence of wrinkle generation in the press forming process of the press formed part is determined. As illustrated in FIG. 19, the wrinkle generation determination device 41 includes an in-plane biaxial strain and load relationship acquisition unit 43, a stable behavior limit strain acquisition unit 45, a stable behavior limit line acquisition unit 47, a wrinkle generation starting strain acquisition unit 49, a wrinkle generation start line acquisition unit 51, a press formed part in-plane biaxial strain calculation unit 53, a wrinkle generation determination map acquisition unit 55, and a press formed part wrinkle generation determination unit 57.

The wrinkle generation determination device 41 may be configured with a central processing unit (CPU) of a computer (PC or the like). In this case, each of the above units functions when the CPU of the computer executes a predetermined program.

<<In-Plane Biaxial Strain and Load Relationship Acquisition Unit>>

The in-plane biaxial strain and load relationship acquisition unit 43 changes the load ratio in the in-plane biaxial directions acting on the measurement part 101 in the biaxial stress test, and acquires, in the process of inducing the out-of-plane buckling in the measurement part 101, the relationship between the in-plane biaxial strain generated in the measurement part 101 and the load for each load ratio. In the present embodiment, the in-plane biaxial strain and load relationship acquisition unit 43 executes the in-plane biaxial strain and load relationship acquisition step S1 described above.

<<Stable Behavior Limit Strain Acquisition Unit>>

From the relationship between the in-plane biaxial strain and the load acquired for each load ratio by the in-plane biaxial strain and load relationship acquisition unit 43, the stable behavior limit strain acquisition unit 45 calculates for each load ratio, the primary differential coefficient of the in-plane uniaxial strain on which the compressive load acts, obtains a point at which the primary differential coefficient of the calculated strain becomes the local maximum as the stable behavior limit point that will be a starting point of the out-of-plane buckling, and acquires an in-plane biaxial strain of the measurement part 101 at the stable behavior limit point as the stable behavior limit strain. In the present embodiment, the stable behavior limit strain acquisition unit 45 executes the above-described stable behavior limit strain acquisition step S3.

<<Stable Behavior Limit Line Acquisition Unit>>

The stable behavior limit line acquisition unit 47 plots the stable behavior limit strain in the in-plane biaxial directions acquired for each load ratio by the stable behavior limit strain acquisition unit 45 on the two-dimensional coordinates, and obtains the stable behavior limit line that will be the wrinkle generation index under the biaxial stress condition by connecting the plotted stable behavior limit strains. In the present embodiment, the stable behavior limit line acquisition unit 47 executes the above-described stable behavior limit line acquisition step S5.

<<Wrinkle Generation Starting Strain Acquisition Unit>>

From the relationship between the in-plane biaxial strain and the load acquired for each load ratio by the in-plane biaxial strain and load relationship acquisition unit 43, the wrinkle generation starting strain acquisition unit 49 obtains, for each load ratio, a point at which the polarity of the increment of strain with respect to the increment of compressive load in the relationship between the in-plane uniaxial strain on which the compressive load acts and the load is reversed as the wrinkle generation starting point, and acquires an in-plane biaxial strain in the measurement part 101 at the wrinkle generation starting point as the wrinkle generation starting strain. In the present embodiment, the wrinkle generation starting strain acquisition unit 49 executes the wrinkle generation starting strain acquisition step S13 described above.

<<Wrinkle Generation Start Line Acquisition Unit>>

The wrinkle generation start line acquisition unit 51 plots the wrinkle generation starting strain in the in-plane biaxial directions acquired for each load ratio on the two-dimensional coordinates, and obtains the wrinkle generation start line under the biaxial stress condition by connecting the plotted wrinkle generation starting strains. In the present embodiment, the wrinkle generation start line acquisition unit 51 executes the above-described wrinkle generation start line acquisition step S15.

<<Press Formed Part In-Plane Biaxial Strain Calculation Unit>>

The press formed part in-plane biaxial strain calculation unit 53 performs the press forming simulation of the press formed part, and obtains an in-plane biaxial strain in the press forming process of the predetermined portion in the press formed part. In the present embodiment, the press formed part in-plane biaxial strain calculation unit 53 executes the in-plane biaxial strain of the press formed part in-plane biaxial strain calculation step S21 described above.

<<Wrinkle Generation Determination Map Acquisition Unit>>

The wrinkle generation determination map acquisition unit 55 indicates the stable behavior limit line obtained by the stable behavior limit line acquisition unit 47 and the wrinkle generation start line obtained by the wrinkle generation start line acquisition unit 51 on the two-dimensional coordinates having the in-plane biaxial strains as the coordinate axes, and acquires the wrinkle generation determination map for determining the presence of wrinkle generation under the biaxial stress condition. In the present embodiment, the wrinkle generation determination map acquisition unit 55 executes the above-described wrinkle generation determination map acquisition step S23.

<<Press Formed Part Wrinkle Generation Determination Unit>>

The press formed part wrinkle generation determination unit 57 plots the in-plane biaxial strain in the predetermined portion of the press formed part obtained by the press formed part in-plane biaxial strain calculation unit 53 on the wrinkle generation determination map acquired by the wrinkle generation determination map acquisition unit 55. When plotting on the wrinkle generation determination map is located in the region between the stable behavior limit line and the wrinkle generation start line, the press formed part wrinkle generation determination unit 57 determines that there is a high risk of wrinkle generation on the predetermined portion of the press formed part. When plotting is located on the compression side of the wrinkle generation start line, the press formed part wrinkle generation determination unit 57 determines that wrinkles will be generated in the predetermined portion of the press formed part. In the present embodiment, the press formed part wrinkle generation determination unit 57 executes the press formed part wrinkle generation determination step S25 described above.

[Press Formed Part Wrinkle Generation Determination Program]

The embodiment of the present invention can be configured as a wrinkle generation determination program for a press formed part. In other words the wrinkle generation determination program for a press formed part according to the embodiment of the present invention, as illustrated in FIG. 2 as an example, obtains an index for determining the presence of wrinkle generation under the biaxial stress condition in the press forming process of the press formed part by the biaxial stress test in which a load in the in-plane biaxial directions including at least the compressive load in the in-plane uniaxial direction is applied to the measurement part 101 where the cross shape of the cruciform test piece for biaxial test 100 intersects in the in-plane biaxial directions to induce the out-of-plane buckling in the measurement part 101. Then, the wrinkle generation determination program determines the presence of wrinkle generation in the press forming process of the press formed part. As illustrated in FIG. 19, the wrinkle generation determination program for a press formed part according to the embodiment of the present invention causes a computer to function as the in-plane biaxial strain and load relationship acquisition unit 43, the stable behavior limit strain acquisition unit 45, the stable behavior limit line acquisition unit 47, the wrinkle generation starting strain acquisition unit 49, the wrinkle generation start line acquisition unit 51, the press formed part in-plane biaxial strain calculation unit 53, the wrinkle generation determination map acquisition unit 55, and the press formed part wrinkle generation determination unit 57.

As described above, also in the wrinkle generation determination device and the wrinkle generation determination program for a press formed part according to the present embodiment, similarly to the wrinkle generation determination index acquisition method for a press formed part according to the first embodiment of the present invention described above, the stable behavior limit line and the wrinkle generation start line indicated on the two-dimensional coordinates having the in-plane biaxial strains as the coordinate axes can be obtained as indexes for determining the presence of wrinkle generation under the biaxial stress condition in the press forming process of the press formed part. Furthermore, similarly to the wrinkle generation determination method for a press formed part according to the second embodiment of the present invention, effects demonstrated in the example described later can be achieved.

Example

An experiment and an analysis for verifying the effects of the wrinkle generation determination method for a press formed part according to the present invention have been performed, and will be described below.

Figure 12:
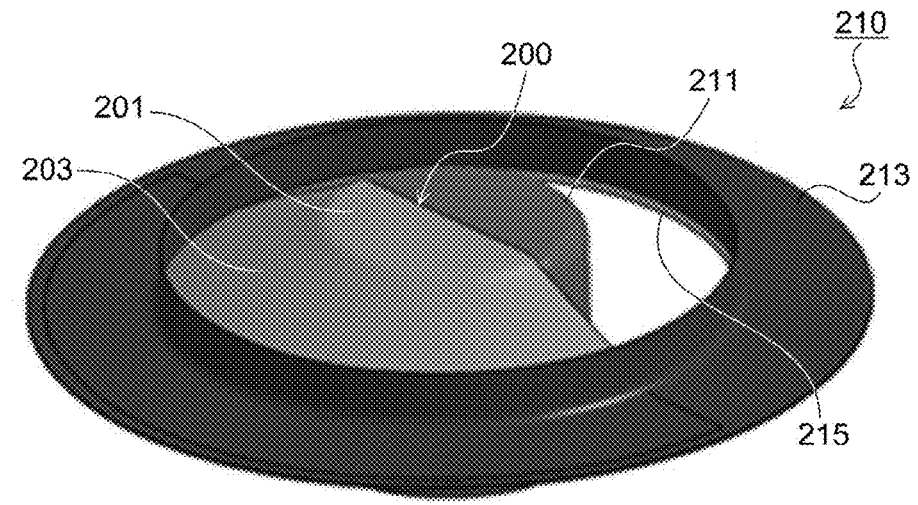
FIG. 12 is a diagram illustrating the press formed part to be formed and a tool used for press forming the press formed part in an example.

In the example, determination of wrinkle generation by the press forming simulation of a press formed part 200 illustrated in FIG. 12 was verified based on the stable behavior limit line and the wrinkle generation start line obtained by the biaxial stress test in which the compressive load in the in-plane biaxial directions is applied to the cruciform test piece for biaxial test.

In the present example, first, as described in the aforementioned first embodiment, the stable behavior limit line and the wrinkle generation start line under the biaxial stress condition were obtained by the biaxial stress test. In the biaxial test, the biaxial stress testing device 1 illustrated in FIGS. 3 and 4 was used for inducing the out-of-plane buckling on the measurement part 101 of the cruciform test piece for biaxial test 100 illustrated in FIG. 2. Then, the wrinkle generation determination map illustrated in FIG. 11 described above was created using the stable behavior limit line and wrinkle generation start line obtained.

In the biaxial stress test, a steel sheet having 270 Mpa-grade tensile strength and sheet thickness of 1.2 mm was used as a test material for the cruciform test piece for biaxial test 100. The size of the measurement part was set to 30 mm×30 mm, and the opening 17 formed in the central tool 11a of the biaxial stress testing device 1 was a circle having a diameter of 25 mm. The biaxial stress condition acting on the measurement part 101 was set to the uniaxial compression condition, the biaxial compression condition, and the tensile-compression condition.

Next, the press forming simulation by FEM analysis was performed on the press formed part 200 having a bulge forming surface 201 and a side surface 203 illustrated in FIG. 12 to determine the presence of wrinkle generation on the press formed part 200. In FIG. 12, only a left half of the press formed part 200 is illustrated so that a condition of a punch 211 can be seen. In the press forming simulation, the press formed part 200 spreads over an entire circumference of a die 213.

As illustrated in FIG. 12, the press formed part 200 was obtained by bulge forming using a tool 210 including a punch 211, the die 213, and a blank holder 215. A circular steel sheet having 270-MPa tensile strength of and sheet thickness of 1.2 mm was used as a blank. Further, a forming height of the press formed part 200 was changed within a range of 20 mm to 50 mm, and the presence of wrinkle generation on the side surface 203 of the press formed part 200 at each forming height was determined based on the wrinkle generation determination map illustrated in FIG. 11. Table 1 indicates a blank material, a tool condition, and an FEM analysis condition.

TABLE 1

| Blank material | Strength | 270 Mpa-grade steel sheet |
| | Sheet thickness | 1.2 mm |
| Tool condition (tool condition) | Punch diameter · shoulder R (shoulder radius | φ 90 · R8 mm |
| | Die diameter · Shoulder R | φ 184 · R5 mm |
| | Cushion pressure | 5 tonf |
| FEM analysis condition | Element (element) type | Solid |
| | Element size | 0.3 mm |
| | Coefficient of friction (a coefficient of friction) | 0.1 |

FIGS. 13 to 16 are diagrams in which the in-plane biaxial strains on the side surface 203 obtained by the press forming simulation of the press formed part 200 having forming heights of 20 mm, 30 mm, 40 mm, and 50 mm are plotted on the wrinkle generation determination map, and a shading diagram of the press formed part 200. In FIGS. 13 to 16, ○ and ● indicate positions where determination of the presence of wrinkle generation in the side surface 203 were evaluated, and the in-plane biaxial strain at these positions.

In the press formed parts 200 having forming height of 25 mm (FIG. 13) and 30 mm (FIG. 14), wrinkle generation on the side surface 203 was not visually confirmed. On the other hand, also in the wrinkle generation determination map, the in-plane biaxial strain on the side surface 203 was located in an upper right region of the stable behavior limit line (in-plane biaxial strain is on the tensile side), and it was determined that no wrinkle will be generated. Accordingly, it is apparent that the presence of wrinkle generation was successfully determined in the press formed part 200 having forming heights of 25 mm and 30 mm.

Note that the above determination was made on the presence of wrinkle generation at the positions of ○ and ● on the side surface 203. A plotted range of the in-plane biaxial strain on the entire side surface 203 is a region indicated in gray in the wrinkle generation determination map illustrated in FIGS. 13 (a) and 14 (a). As a result, it was determined that no wrinkles will be generated at any position on the side surface of the press formed part 200 having forming heights of 25 mm and 30 mm, which was consistent with determination of wrinkle generation by visual observation.

In the press formed part 200 with forming height of 40 mm (FIG. 15), wrinkle generation at the positions of ○ and ● on the side surface 203 was not visually confirmed. On the other hand, also in the wrinkle generation determination map, the in-plane biaxial strain at the positions of ○ and ● on the side surface 203 was located in the upper right region of the stable behavior limit line, and it was determined that no wrinkles will be generated. This determination was consistent with determination of wrinkle generation by visual observation.

However, a plotted range of the in-plane biaxial strain on the entire side surface 203 obtained by the press forming simulation is a region indicated in gray in the wrinkle generation determination map illustrated in FIG. 15 (a). The region extends in a range beyond the stable behavior limit line and the wrinkle generation start line. As a result, it was determined that wrinkles will be generated at a lower portion of the side surface 203, and shadow indicating wrinkles was confirmed at the lower portion of the side surface 203 also in the shading diagram of the press formed part 200 illustrated in FIG. 15 (a).

In the press formed part 200 with forming height of 50 mm (FIG. 16), wrinkle generation was not observed at the position of C on the side surface 203, but wrinkle generation was confirmed at the position of ●. Also in the wrinkle generation determination map, it was determined that no wrinkles were generated at the position of ○ because plotting of the in-plane biaxial strain at the position was located on the upper right of the stable behavior limit line, whereas it was determined that obvious wrinkles were generated at the position of ● because plotting of the in-plane biaxial strain was located on a lower left of the wrinkle generation start line (in-plane biaxial strain is on the compression side). The determination was consistent with determination of wrinkle generation by visual observation.

A plotted range of the in-plane biaxial strain on the entire side surface 203 obtained by the press forming simulation is a region indicated in gray in the wrinkle generation determination map illustrated in FIG. 16 (a). The region is more widely distributed across the stable behavior limit line and the wrinkle generation start line than the region for the forming height of 40 mm (FIG. 15 (a)). Accordingly, by increasing the forming height from 40 mm to 50 mm, the range in which it is determined that wrinkles are generated on the side surface 203 is widened. This was consistent with the fact that the wrinkles are generated in a wide range on the side surface 203 in the shading diagram of the press formed part 200 illustrated in FIG. 16 (b).

FIG. 17 illustrates a positional relationship between the plotted range of the in-plane biaxial strain over the entire side surface 203 and the stable behavior limit line when the forming height of the press formed part 200 is set to 25 mm, 30 mm, 40 mm, and 50 mm. It is apparent from FIG. 17 that, by increasing the forming height, an in-plane biaxial strain range is widened. At forming heights of 40 mm and 50 mm, the range extends to a region beyond the stable behavior limit line. Then, it is determined that faint wrinkles will be generated in a wider range of the side surface at the forming height of 50 mm.

FIG. 18 illustrates a positional relationship between the plotted range of the in-plane biaxial strain over the entire side surface 203 and the wrinkle generation start line when the forming height of the press formed part 200 is set to 25 mm, 30 mm, 40 mm, and 50 mm. It is apparent from FIG. 18 that, by increasing the forming height, the in-plane biaxial strain range is widened, and at the forming heights of 40 mm and 50 mm, the range extends to a region beyond the wrinkle generation start line. Then, it is determined that obvious wrinkles will be generated in a wider range of the side surface at the forming height of 50 mm.

For the press formed part 200 whose forming height is changed in the range from 20 mm to 50 mm, Table 2 indicate results of visual determination of the presence of wrinkle generation and results of determination of the presence of wrinkle generation using the stable behavior limit line and the wrinkle generation start line in the method according to the present invention.

TABLE 2

| Forming height/mm | Determination by visual observation | Determination by stable behavior limit line | Determination by wrinkle generation limit line |
|---|---|---|---|
| 20 | o | o | o |
| 21 | o | o | o |
| 22 | o | o | o |
| 23 | o | o | o |
| 24 | o | o | o |
| 25 | o | o | o |
| 26 | o | o | o |
| 27 | o | o | o |
| 28 | o | o | o |
| 29 | o | o | o |
| 30 | o | o | o |
| 31 | x | x | o |
| 32 | x | x | o |
| 33 | x | x | o |
| 34 | x | x | o |
| 35 | x | x | o |
| 36 | x | x | o |
| 37 | x | x | o |
| 38 | x | x | o |
| 39 | x | x | o |
| 40 | x | x | o |
| 41 | x | x | o |
| 42 | x | x | o |
| 43 | x | x | x |
| 44 | x | x | x |
| 45 | x | x | x |
| 46 | x | x | x |
| 47 | x | x | x |
| 48 | x | x | x |
| 49 | x | x | x |
| 50 | x | x | x |

(No wrinkles: o Wrinkles: x)

For the visual determination of wrinkle generation, the side surface 203 of the press formed part 200 was irradiated with light from various directions to perform detailed visual observation and determine the presence of faint wrinkles. The determination was consistent with the determination result of the presence of wrinkles based on the stable behavior limit line according to the present invention. In addition, although the visual determination of wrinkle generation does not distinguish between faint wrinkles and obvious wrinkles, it was determined in the determination result based on the wrinkle generation start line according to the present invention that obvious wrinkles were generated when the forming height is 43 mm or more, which is the forming height larger than that of the press formed part where generation of faint wrinkles were determined based on the stable behavior limit line.

Accordingly, the wrinkle generation determination index acquisition method for a press formed part according to the present invention is capable of satisfactorily determining the presence of wrinkle generation under the biaxial stress condition in the press forming process of the press formed part based on the objective index. Further, according to the present invention, it is possible to distinguish and determine faint wrinkles and obvious wrinkles.

The above example is the results for a 270 MPa-grade cold rolled steel sheet. However, the present invention is not limited to the 270 MPa-grade steel sheet or cold rolled steel sheet, and may be a high tensile strength steel sheet such as a 1180 MPa-grade steel sheet, a hot rolled steel sheet, and other materials.

INDUSTRIAL APPLICABILITY

The present invention provides the wrinkle generation determination index acquisition method, the wrinkle generation determination method, the wrinkle generation determination device, and the wrinkle generation determination program for a press formed part capable of obtaining the index for determining the presence of wrinkle generation under the biaxial stress condition in the press forming process of the press formed part in the biaxial stress test in which the compressive load at least in the in-plane uniaxial direction is applied to the cruciform test piece for biaxial test having cross shape, and further determining the presence of wrinkle generation under the biaxial stress condition based on the index obtained.

REFERENCE SIGNS LIST

1 BIAXIAL STRESS TESTING DEVICE
11 CENTRAL TOOL
11a CENTRAL TOOL
11b CENTRAL TOOL
13 CENTER PART
13a CENTER PART
15 FIRST COMB-SHAPE PART
15a FIRST COMB-SHAPE PART
15b FIRST COMB-SHAPE PART
17 OPENING
19 BOLT
21 SIDE TOOL
21a SIDE TOOL
21b SIDE TOOL
23 SECOND COMB-SHAPE PART
23a SECOND COMB-SHAPE PART
23b SECOND COMB-SHAPE PART
25 HOLDING PART
25a HOLDING PART
25b HOLDING PART
27a ROLLER
27b ROLLER
31 PRESS MECHANISM
33 BASE PART
35 TOP PLATE
37 GUIDE PIN
41 WRINKLE GENERATION DETERMINATION DEVICE
43 IN-PLANE BIAXIAL STRAIN AND LOAD RELATIONSHIP ACQUISITION UNIT
45 STABLE BEHAVIOR LIMIT STRAIN ACQUISITION UNIT
47 STABLE BEHAVIOR LIMIT LINE ACQUISITION UNIT
49 WRINKLE GENERATION STARTING STRAIN ACQUISITION UNIT
51 WRINKLE GENERATION START LINE ACQUISITION UNIT
53 PRESS FORMED PART IN-PLANE BIAXIAL STRAIN CALCULATION UNIT
55 WRINKLE GENERATION DETERMINATION MAP ACQUISITION UNIT
57 PRESS FORMED PART WRINKLE DETERMINATION UNIT
100 CRUCIFORM TEST PIECE FOR BIAXIAL TEST
101 MEASUREMENT PART
103 PIECE PART
103a PIECE PART
103b PIECE PART
105 CIRCULAR NOTCH PORTION
107 HOLE-SHAPED PORTION
200 PRESS FORMED PART
201 BULGE FORMING SURFACE

203 SIDE SURFACE
210 TOOL
211 PUNCH
213 DIE
215 BLANK HOLDER

The invention claimed is:

1. A method for acquiring a wrinkle generation determination index for a press formed part, the method obtaining an index for determining presence or absence of wrinkle generation under a biaxial stress condition in a press forming process of the press formed part by a biaxial stress test, the biaxial stress test applying a load in in-plane biaxial directions including at least a compressive load in an in-plane uniaxial direction to a measurement part in an intersecting cross shape of a cruciform test piece for biaxial test, the load being applied to induce out-of-plane buckling in the measurement part, the method comprising:

acquiring an in-plane biaxial strain and load relationship by changing a load ratio in the in-plane biaxial directions acting on the measurement part in the biaxial stress test and acquiring, for each the load ratio, a relationship between an in-plane biaxial strain and the load, the in-plane biaxial strain being generated in the measurement part in a process of inducing the out-of-plane buckling in the measurement part;

acquiring a stable behavior limit strain by calculating, for each the load ratio, a primary differential coefficient of a strain in the in-plane uniaxial direction on which a larger compressive load acts, obtaining a point at which the primary differential coefficient of the strain calculated becomes local maximum as a stable behavior limit point, and acquiring an in-plane biaxial strain at the stable behavior limit point in the measurement part as the stable behavior limit strain; and acquiring a stable behavior limit line by plotting, on two-dimensional coordinates, the stable behavior limit strain in the in-plane biaxial directions acquired for each the load ratio and connecting the stable behavior limit strain plotted to obtain the stable behavior limit line to be an index for wrinkle generation under the biaxial stress condition.

2. The method according to claim 1, further comprising:

acquiring, for each the load ratio, a wrinkle generation starting strain by obtaining a point at which a polarity of an increment of a strain with respect to an increment of the compressive load is reversed in a relationship between an in-plane uniaxial strain on which a larger compressive load acts and the load as a wrinkle generation starting point, and acquiring an in-plane biaxial strain at the wrinkle generation starting point in the measurement part as the wrinkle generation starting strain; and acquiring a wrinkle generation start line by plotting, on two-dimensional coordinates, the wrinkle generation starting strain in the in-plane biaxial directions acquired for each the load ratio and connecting the wrinkle generation starting strain plotted to obtain the wrinkle generation start line under the biaxial stress condition.

3. A wrinkle generation determination method for a press formed part determining presence or absence of wrinkle generation in a press forming process of the press formed part by using the stable behavior limit line and a wrinkle generation start line obtained by the method according to claim 2, the wrinkle generation determination method comprising:

calculating an in-plane biaxial strain in the press formed part by performing a press forming simulation on the press formed part so as to obtain the in-plane biaxial strain in the press forming process of the press formed part;

acquiring a wrinkle generation determination map indicating the stable behavior limit line and the wrinkle generation start line on two-dimensional coordinates having in-plane biaxial strains as coordinate axes; and determining wrinkle generation on the press formed part by performing plotting of the in-plane biaxial strain in a predetermined portion of the press formed part on the wrinkle generation determination map obtained, determining that there is a high risk of wrinkle generation in the predetermined portion of the press formed part when the plotting is located in a region between the stable behavior limit line and the wrinkle generation start line, and determining that there is wrinkle generation in the predetermined portion of the press formed part when the plotting is located on a compression side from the wrinkle generation start line.

4. A wrinkle generation determination device for a press formed part determining presence or absence of wrinkle generation in a press forming process of the press formed part by obtaining an index for determining the presence or absence of wrinkle generation under a biaxial stress condition in the press forming process of the press formed part by a biaxial stress test, the biaxial stress test applying a load in in-plane biaxial directions including at least a compressive load in an in-plane uniaxial direction to a measurement part in an intersecting cross shape of a cruciform test piece for biaxial test, the load being applied to induce out-of-plane buckling in the measurement part, the wrinkle generation determination device comprising:

an in-plane biaxial strain and load relationship acquisition unit configured to change a load ratio in the in-plane biaxial directions acting on the measurement part in the biaxial stress test and acquire, for each the load ratio, a relationship between an in-plane biaxial strain and the load, the in-plane biaxial strain being generated in the measurement part in a process of inducing the out-of-plane buckling in the measurement part;

a stable behavior limit strain acquisition unit configured to calculate, for each the load ratio, a primary differential coefficient of a strain in the in-plane uniaxial direction on which a larger compressive load acts, obtain a point at which the primary differential coefficient of the strain calculated becomes local maximum as a stable behavior limit point, and acquire an in-plane biaxial strain at the stable behavior limit point in the measurement part as a stable behavior limit strain;

a stable behavior limit line acquisition unit configured to plot, on two-dimensional coordinates, the stable behavior limit strain in the in-plane biaxial directions acquired for each the load ratio and connect the stable behavior limit strain plotted to obtain a stable behavior limit line to be an index for wrinkle generation under the biaxial stress condition;

a wrinkle generation starting strain acquisition unit configured to obtain a point at which a polarity of an increment of a strain with respect to an increment of the compressive load is reversed in a relationship between an in-plane uniaxial strain on which a larger compressive load acts and the load as a wrinkle generation starting point, and acquire an in-plane biaxial strain at the wrinkle generation starting point in the measurement part as a wrinkle generation starting strain;

a wrinkle generation start line acquisition unit configured to plot, on two-dimensional coordinates, the wrinkle generation starting strain in the in-plane biaxial directions obtained for each the load ratio and connect the wrinkle generation starting strain plotted to obtain a wrinkle generation start line under the biaxial stress condition;

a press formed part in-plane biaxial strain calculation unit configured to perform a press forming simulation on the press formed part so as to obtain the in-plane biaxial strain in the press forming process of the press formed part;

a wrinkle generation determination map acquisition unit configured to acquire a wrinkle generation determination map indicating the stable behavior limit line and the wrinkle generation start line on two-dimensional coordinates having in-plane biaxial strains as coordinate axes; and a press formed part wrinkle generation determination unit configured to perform plotting of the in-plane biaxial strain in a predetermined portion of the press formed part on the wrinkle generation determination map obtained, determine that there is a high risk of wrinkle generation in the predetermined portion of the press formed part when the plotting is located in a region between the stable behavior limit line and the wrinkle generation start line, and determine that there is wrinkle generation in the predetermined portion of the press formed part when the plotting is located on a compression side of the wrinkle generation start line.

5. A non-transitory computer-readable recording medium on which an executable program for determining presence or absence of wrinkle generation in a press forming process of a press formed part by obtaining an index for determining the presence or absence of wrinkle generation under a biaxial stress condition in the press forming process of the press formed part by a biaxial stress test, the biaxial stress test applying a load in in-plane biaxial directions including at least a compressive load in an in-plane uniaxial direction to a measurement part in an intersecting cross shape of a cruciform test piece for biaxial test, the load being applied to induce out-of-plane buckling in the measurement part, the program causing a processor of a computer to execute:

changing a load ratio in the in-plane biaxial directions acting on the measurement part in the biaxial stress test and acquiring, for each the load ratio, a relationship between an in-plane biaxial strain and the load, the in-plane biaxial strain being generated in the measurement part in a process of inducing the out-of-plane buckling in the measurement part;

calculating, for each the load ratio, a primary differential coefficient of a strain in the in-plane uniaxial direction on which a larger compressive load acts, obtaining a point at which the primary differential coefficient of the strain calculated becomes local maximum as a stable behavior limit point, and acquiring an in-plane biaxial strain at the stable behavior limit point in the measurement part as a stable behavior limit strain;

plotting, on two-dimensional coordinates, the stable behavior limit strain in the in-plane biaxial directions acquired for each the load ratio and connecting the stable behavior limit strain plotted to obtain a stable behavior limit line to be an index for wrinkle generation under the biaxial stress condition;

obtaining a point at which a polarity of an increment of a strain with respect to an increment of the compressive load is reversed in a relationship between an in-plane uniaxial strain on which a larger compressive load acts and the load as a wrinkle generation starting point, and acquiring an in-plane biaxial strain at the wrinkle generation starting point in the measurement part as a wrinkle generation starting strain;

plotting, on two-dimensional coordinates, the wrinkle generation starting strain in the in-plane biaxial directions obtained for each the load ratio and connecting the wrinkle generation starting strain plotted to obtain a wrinkle generation start line under the biaxial stress condition;

performing a press forming simulation on the press formed part so as to obtain the in-plane biaxial strain in the press forming process of the press formed part;

acquiring a wrinkle generation determination map indicating the stable behavior limit line and the wrinkle generation start line on two-dimensional coordinates having in-plane biaxial strains as coordinate axes; and performing plotting of the in-plane biaxial strain in a predetermined portion of the press formed part on the wrinkle generation determination map obtained, determining that there is a high risk of wrinkle generation in the predetermined portion of the press formed part when the plotting is located in a region between the stable behavior limit line and the wrinkle generation start line, and determining that there is wrinkle generation in the predetermined portion of the press formed part when the plotting is located on a compression side of the wrinkle generation start line.

* * * * *